US009963573B2

(12) United States Patent
Ericsson et al.

(10) Patent No.: US 9,963,573 B2
(45) Date of Patent: May 8, 2018

(54) POLYOLEFIN PIPE

(71) Applicant: Uponor Innovation AB, Virsbo (SE)

(72) Inventors: Jan Ericsson, Lakeville, MN (US); Andrew Ortquist, Lakeville, MN (US); Todd Menssen, Northfield, MN (US); Jacob John, Eagn, MN (US); Josh Meeker, Lakeville, MN (US)

(73) Assignee: Uponor Innovation AB, Virsbo (SE)

( * ) Notice: Subject to any disclaimer, the term of this patent is extended or adjusted under 35 U.S.C. 154(b) by 0 days. days.

(21) Appl. No.: 14/787,865

(22) PCT Filed: Apr. 23, 2014

(86) PCT No.: PCT/EP2014/058218
§ 371 (c)(1),
(2) Date: Oct. 29, 2015

(87) PCT Pub. No.: WO2014/177435
PCT Pub. Date: Nov. 6, 2014

(65) Prior Publication Data
US 2016/0130420 A1 May 12, 2016

Related U.S. Application Data

(60) Provisional application No. 61/819,038, filed on May 3, 2013.

(51) Int. Cl.
| | | |
|---|---|---|
| *C08K 5/134* | (2006.01) |
| *B29C 47/00* | (2006.01) |
| *B29C 35/10* | (2006.01) |
| *B29C 47/36* | (2006.01) |
| *B29C 47/40* | (2006.01) |
| *B29C 47/88* | (2006.01) |
| *B29C 47/90* | (2006.01) |
| *C08J 3/28* | (2006.01) |
| *C08K 5/132* | (2006.01) |
| *F16L 9/12* | (2006.01) |
| *B29C 47/08* | (2006.01) |
| *B29K 23/00* | (2006.01) |
| *B29C 35/08* | (2006.01) |

(52) U.S. Cl.
CPC ............ *C08K 5/1345* (2013.01); *B29C 35/10* (2013.01); *B29C 47/0004* (2013.01); *B29C 47/0023* (2013.01); *B29C 47/0898* (2013.01); *B29C 47/364* (2013.01); *B29C 47/40* (2013.01); *B29C 47/882* (2013.01); *B29C 47/8805* (2013.01); *B29C 47/8895* (2013.01); *B29C 47/90* (2013.01); *B29C 47/908* (2013.01); *C08J 3/28* (2013.01); *C08K 5/132* (2013.01); *F16L 9/12* (2013.01); *B29C 2035/0827* (2013.01); *B29K 2023/00* (2013.01)

(58) Field of Classification Search
CPC .. C08K 5/1435; C08K 5/132; B29C 47/0004; B29C 47/40; B29C 47/90; B29C 47/0898; B29C 35/10; B29C 47/364; B29C 47/882; C08L 23/02; B29K 2023/00; C08J 3/28; F16L 9/12
USPC ........... 522/46, 33, 6, 71, 189, 184, 1; 520/1
See application file for complete search history.

(56) References Cited

U.S. PATENT DOCUMENTS

| | | | |
|---|---|---|---|
| 5,735,830 A | 4/1998 | Fritz et al. | |
| 8,114,493 B2 | 2/2012 | Sherman et al. | |
| 2005/0037277 A1* | 2/2005 | Herlihy | ................. C07C 69/712 430/270.1 |
| 2007/0003720 A1 | 1/2007 | Gray et al. | |
| 2008/0045619 A1* | 2/2008 | Jackson | ................... C08J 3/243 522/32 |
| 2010/0272937 A1 | 10/2010 | Sherman et al. | |

FOREIGN PATENT DOCUMENTS

| | | | |
|---|---|---|---|
| CN | 1062149 A | | 6/1992 |
| CN | 103012939 | * | 4/2013 |
| DE | 102004061981 | | 7/2006 |
| DE | 102004061982 | | 7/2006 |
| DE | 102004061983 | | 7/2006 |
| DE | 102004061986 | | 7/2006 |
| DE | 102004061987 | | 7/2006 |
| DE | 102006017445 | | 10/2007 |
| DE | 102006017446 | | 10/2007 |
| DE | 102010046715 | | 3/2012 |
| EP | 0490854 | * | 6/1992 |
| EP | 1674513 | | 6/2006 |
| EP | 1731535 | | 12/2006 |
| EP | 2068329 | | 6/2009 |
| FR | 2710344 | | 3/1995 |

(Continued)

OTHER PUBLICATIONS

Bengt, EP 0490854 Machine Translation, Jun. 17, 1992.*

(Continued)

*Primary Examiner* — Jessica Whiteley

(74) *Attorney, Agent, or Firm* — Greenberg Traurig, LLP; Chinh H. Pham; Natalie Salem

(57) ABSTRACT

This invention relates to a polymeric pipe, and more particularly a polymeric pipe where the pipe comprises a crosslinked polyolefin formed from extruded polyolefin comprising a photoinitiator and a reactive extrusion species. More particularly, this invention relates to the manufacturing of plastic pipes and tubing by utilizing co-rotating twin screw extrusion combined with photo-induced crosslinking, of thermoplastic polymers such as polyethylene, to produce PEX pipes and tubing.

18 Claims, 3 Drawing Sheets

(56) References Cited

FOREIGN PATENT DOCUMENTS

| JP | 03-180323 A | 1/1993 |
|---|---|---|
| JP | 2001-074182 | 3/2001 |
| NL | 1008960 C | 10/1999 |
| WO | 1985/005316 | 12/1985 |
| WO | 2000/057070 | 9/2000 |
| WO | 2002/042368 | 5/2002 |
| WO | 2002/051913 | 7/2002 |
| WO | 2002/098657 | 12/2002 |
| WO | 2005/070671 | 8/2005 |
| WO | 2008/012325 | 1/2008 |
| WO | 2008/016518 | 2/2008 |
| WO | 2008/109863 | 9/2008 |
| WO | 2010/138816 | 12/2010 |

OTHER PUBLICATIONS

Qiang et al, CN 103012939 Machine Translation, Apr. 3, 2013.*
"GPSSafetySummary Bis(2,2,6,6-tetramethyl-4-piperidyl) sebacate", Jul. 1, 2011, http://www.basf.com/group/corporate/es/literature-document:/GPS Safety Summaries—Bis 2 2 6 6 tetramethyl 4 piperidyl sebacate-English.pdf.
International Search Report and Written Opinion for Application No. PCT/EP2014/058218 dated Jul. 3, 2014.
PCT International Search Report and Written Opinion issued in International Application No. PCT/UP2014/058218 dated Jul. 3, 2014.
Search Report issued in British Application No. GB1310551.5 dated Aug. 19, 2013.
Search Report issued in British Application No. GB1310551.5 dated Jun. 11, 2014.
"Standard Specification for Crosslinked Polyethylene (PEX) Tubing1", An American National Standard, Issued under the fixed designation F876, Copyright by ASTM International, (2010).
GPS Safety Summary—Arkema—Photocure Resins—Propoxylated Glycerol Triacrylate—SR 9020—Mar. 11, 2013—V0.
Chen et al., "Performance and Application of New Type Mixing Elements in Co-Rotating Twin Screw Extruders", China Plastics, Issue 6, pp. 286-294, Jun. 28, 2001.
Office Action for Chinese patent application No. 201480024950.6, dated Jul. 24, 2017.

* cited by examiner

POLYOLEFIN PIPE

CROSS-REFERENCE TO RELATED APPLICATIONS

This application is a national phase application under 35 U.S.C. 371 of International Application No. PCT/EP2014/058218, filed Apr. 23, 2014, which claims priority to and the benefit of U.S. Provisional Application No. 61/819,038, filed May 3, 2013, the disclosures of each of which are incorporated herein by reference in their entireties.

FIELD OF THE INVENTION

This invention relates to a polymeric pipe, and more particularly a polymeric pipe where the pipe comprises a crosslinked polyolefin formed from extruded polyolefin comprising photoinitiator. The invention also relates to a polymeric pipe where the pipe also comprises a scavenger; and/or co-agent and a stabilizer; this is sometimes referred to as a co-agent and/or stabilizer package. More particularly, this invention relates to the manufacturing of plastic pipes and tubing by utilizing co-rotating twin screw extrusion combined with photo-induced crosslinking, of polyolefinic polymers such as polyethylene, to produce crosslinked polyethylene (PEX) pipes and tubing. The pipes are intended to be used in cold (e.g. potable) or hot water applications. They are particularly suitable for cold water application since they may exceed all current standards for drinking water transmission.

BACKGROUND

Extruded pipes made from polyolefin polymers are well known for a variety of industrial applications. Typically they are used in the building industry for domestic (e.g. potable) water pipes, radiator pipes, floor-heating pipes and for similar applications in ship building etc. Such pipes can also be used as district heating pipes and as process pipes in the food industry etc. Other applications include the conveyance of gaseous fluids and slurries.

The polyolefin used in extruded pipes is often crosslinked, as this provides a number of advantages. Such advantages include, but are not limited to, long term stability including oxidation resistance, which assists in meeting current codes and standards for potable water applications, flexibility in installation including a "memory effect", etc. Crosslinked polyethylene (PEX) is commonly used for plastic pipes. There are several varieties of PEX that utilize a number of different crosslinking chemistries and processing technologies. Various PEX grades further contain other additives such as antioxidants and/or stabilizer packages in different concentrations and combinations. Three known varieties of PEX for pipe applications are PEX-a, PEX-b, and PEX-c.

In the PEX-a process ("Engel Method"), the cross-linking is induced by peroxide under the influence of heat and high pressure. The resultant PEX-a composition is crosslinked through carbon-carbon bonds to form the cross-linked polymer network. The PEX-a crosslinking process occurs in the melted stage, as opposed to the primary crosslinking processes for PEX-b and PEX-c. The primary reaction is the formation of free radicals upon decomposition of the peroxide, which has to be present by definition for PEX-a, and subsequently, the free radical abstracts hydrogens from the PE polymer chains. The latter gives new carbon radicals, which next combines with neighboring PE chains to form stable carbon-carbon bonds, i.e., crosslinks. The crosslinking, which is considered to be homogeneous and uniform for PEX-a, gives degrees of crosslinking (typically referred to as CCL) in the range of 70-90% for practical applications. Requirement for CCL is to be above 70% for PEX-a as defined in ASTM International Standard for Crosslinked Polyethylene (PEX) Tubing, F 876-10 (approved Feb. 1, 2010). The PEX-a process may therefore be used to produce good quality pipes.

In the PEX-b process, the crosslinking is induced by moisture and heat over extended pre-determined times typically conducted in a "Sauna atmosphere". The most commonly used methods are referred to as the Sioplas (two-steps), and the Monosil (one step) methods, respectively. In the Sioplas method, a silane, such as for example a vinyl-silane is grafted to a HDPE resin prior to pipe extrusion. In the Monosil method, a silane is blended with the HDPE resin during pipe extrusion. In both methods, which are chemically different in the pre-crosslinking steps, the fundamental principle for the actual crosslinking are practically identical, i.e., the crosslinking occurs in a secondary post-extrusion process that is accelerated by a combination of heat and moisture. The latter combination is the active "reagent", which is involved in the primary hydrolysis and condensation reaction. In principle, the extruded pipe is exposed to hot water and a steam bath. A fundamental difference to PEX-a, is that for PEX-b, the resultant crosslinks are not between carbon-carbon bonds, but instead, oxygen-silicon covalent bonds (siloxane "bridges") are formed. In comparison with PEX-a, the crosslink density (CCL) are somewhat lower for PEX-b (65-70%), and the crosslinking is also less uniform.

In the PEX-c process, the crosslinking is commonly referred to as a "cold" method. In the PEX-c process, no chemicals are needed in order to facilitate the crosslinking process, but instead high energy electron beam (EB) irradiation is utilized to create the free radicals necessary for the hydrogen abstraction and subsequent crosslinking to take place. The high energy electron beams are non-selective, i.e., chemical bonds are cleaved in an un-controlled fashion. The latter has the consequence of creating side reactions, together with the reaction aimed for, i.e., the crosslinking of HDPE. The crosslinking density for PEX-c is typically in the 70-75% range, and caution has to be taken with irradiation time since a too long exposure may give discolored products and/or brittleness. PEX-c has been successfully used for many years despite the somewhat challenging production conditions.

Another possible crosslinking process is ultra violet (UV) curing, i.e., photoinduced crosslinking, where a pipe formulation comprising a combination of a polyolefinic polymer such for example polyethylene, a photoinitiator, a co-agent, and a stabilizer package, is exposed to UV radiation to form a crosslinked polymer. In the case where polyethylene is utilized, the final product is a PEX pipe. UV curing is generally considered to be a "green" and environmentally friendly technology, since no solvents are used in the process and no emission of volatile chemicals takes place.

One major challenge that occurs with all extruded pipes used for drinking water applications is the potential issue with leaching of the various additives from the polymer pipe matrix. The various additives which include initiators, stabilisers, co-agents, processing aids, antioxidants, etc. may leach from the polymer matrix over time and can become available to contaminate the fluid contents flowing within the pipe. This problem is a particular issue in cases such as drinking water applications and industry standards exist which quantify the allowable safe levels of leaching of materials from the pipe over a period of time for such applications. The various additives are required to be present in the pipe when manufacturing it in order to facilitate processing of the pipe when extruding the raw material polymer and also to ensure structural integrity and resistance to ageing etc. of the finished pipe. At the same time, the very presence of these materials presents a challenge since these materials may leach from the polymer matrix over a period of time.

The use of plastics pipes in drinking water applications is a challenge as described above. One difficulty is the requirement to find the right stabiliser or combination of stabilizers that gives sufficient long-term stability. One measure of this stability is chlorine resistance according to the standard ASTM F2023. At the same time, the stabilizers, anti-oxidants, photoinitiators, co-agents, and other additives, should not generate too high levels of remaining residuals in the final pipe products, which would make it impossible to meet the standards required for drinking water pipes (in North America this is the NSF 61 standard). However, we have found a novel combination of a specific processing method, i.e., co-rotating twin screw technology and photo-induced crosslinking, which if combined with the novel chemical approach presented in the present invention, produces crosslinked polyolefinic pipes that meets and exceeds the current standards applied for plastic pipes utilized for drinking water applications, such as crosslinked polyethylene (PEX).

A stabiliser package is typically needed to ensure the pipes have practical utility. However, stabilisers also have a tendency to leach from plastics pipes over a period of time. Stabilisation of thermoplastic polymers is usually accomplished by melt blending with one or more stabilisers. In this way a heterophase polymer/stabiliser system is formed, which may be best described as a physical dispersion of a low molecular weight stabiliser in a polymer matrix. The vast majority of commercial stabiliser compounds have very different chemical structure from that of the non-polar host thermoplastic polymer. For this reason, the compatibility of various conventional stabilisers with polyolefins is generally poor, thereby leading to migration i.e. leaching of admixed stabilisers across the boundary of the polyolefin with neighbouring fluids, liquids, gases or solid materials. This loss of stabiliser substantially shortens the lifetime of the polyolefin. Of more concern is the fact that the migration of stabilisers into drinking water (potable water) can also have unpredictable and potentially toxic effects on consumers. We have previously developed a stabiliser package that is suitable for use in drinking water pipes, as is described in WO 2010/138816.

A method for studying stabiliser migration involves immersing the pipe in boiling water with subsequent measurement of the oxidation induction time (OIT) level, which gives an indication of how much active stabiliser is remaining in the pipe and measures how easily the stabiliser is able to leach out of the pipe wall.

Similarly, other additives such as crosslinking agents are required in order to ensure the structural integrity of the pipes in the senses of both their immediate ability to withstand pressure from fluid being transported within, and to ensure their overall long-term performance. The long-term performance of plastics pipes is typically evaluated using the Standard Extrapolation Method (SEM) test of ISO 9080 (e.g. in Europe) or the ASTM D 2837 method (e.g. in North America). These methods involve testing pipes that are pressurised at elevated temperatures and measures the time to burst at different stress levels. Considerable research effort has been focused on so-called stage III ruptures, which take place when the stabiliser package has ceased to be effective or if the degree of crosslinking is insufficient.

EP 0 490 854 B1 describes the use of double screw extruders in combination with UV irradiation to produce crosslinked polyethylene pipes such as those intended for hot water applications. This document discloses specific photoinitiators for achieving crosslinking to enable the fast processing of polymeric materials. A series of benzophenone derivatives is disclosed which are said to be compatible with polyethylene. However, this document does not address the issue of leaching of such materials from the polymer matrix.

The polymer materials of EP 0 490 854 B1 may be prepared using a twin screw extruder. However, the patent is more concerned with the nature of the photoinitiators and does not actually describe the features of the extruder other than its ability to mix and extrude material. The line speeds achievable with the process claimed in that patent are also quite low and were in the range of 1 m/min or less. This is not ideal for a commercial process.

It is apparent that known extruded pipes and methods of making such pipes are subject to a number of limitations. There is therefore a need for new methods of production and/or new combinations of chemical components to improve the methods of production and/or properties of polyolefin pipes.

It is an aim of the present invention to provide materials for forming pipes that can be used in domestic cold and/or hot water application. It is also an aim to provide materials for producing pipes for industrial application. It is an aim to produce pipes which are resistant to the leaching out over time of one or more of the additive components. A further aim is to produce pipes for domestic applications which meet or exceed current standards for one or more of burst strength, pressure resistance, degradation, leaching of additives over time, discolouration, and resistance to chlorine. The present invention satisfied some or all of these aims.

BRIEF SUMMARY OF THE DISCLOSURE

The present invention is concerned with a process for producing extruded plastics pipes which benefit from a greatly reduced level of leaching of chemical residuals relative to the existing products currently available in the marketplace. The present invention also provides a pipe which is stable to leaching to a far greater degree than is the case for currently available pipes. The present invention also provides pipes which benefit from a greatly increased level of resistance to oxidative degradation. The pipes show an excellent level of resistance to chlorine and exceed the current requirements for drinking water applications. The process of the invention utilises a novel co-rotating twin-screw extrusion process which, as is described below, results in a product having substantially lower levels of leaching of chemical residuals relative to existing extruded pipes used for drinking water applications. The new process also provides superior long-term performance due to outstanding material mixing in the pipe extrusion process, leading to maximized pipe matrix homogeneity, which is critical for resistance to oxidation.

Preferably the present invention utilises combinations of photoinitiator(s) and co-agent(s), that can be combined in the process to provide the necessary level of crosslinking of the polyolefinic polymer (e.g. polyethylene), to produce for example, PEX pipes. This is achieved at the same time as ensuring very low levels of leaching of the components from the extended pipe. The present invention allows low levels of the various components to be used whilst still preserving excellent properties in the finished pipe.

For NSF 61 requirements there is a need to choose the initiator carefully and to include a scavenger to provide low levels of leaching. Long term resistance to oxidative degradation may be of lesser importance for such pipes of the invention.

Thus one aspect of the invention provides a polymeric pipe formed from a polyolefin structural polymer, a photoinitiator in an amount of 0.02 to 3% by weight and a scavenger in an amount of 0.01 to 2% by weight, wherein the photoinitiator is a compound of formula I:

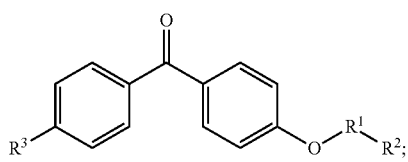

wherein
$R^1$ is selected from —$(CH_2)_m(C=O)[O(CH_2)_n]_pO(C=O)(CH_2)_q$—, —$(C=O)(C_5\text{-}C_{24}$ alkyl), and —$(C=O)(C_5\text{-}C_{24}$ alkenyl):
$R^2$ is selected from —H, —OH, -halo, —$(C_1\text{-}C_4)$alkyl, —$(C_2\text{-}C_4)$alkenyl, and formula II:

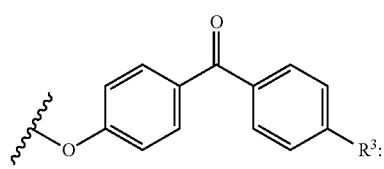

and
$R^3$ is selected from —H, -halo, —OH, —$(C_1\text{-}C_4)$alkyl, —$(C_2\text{-}C_4)$alkenyl, —$O(C_1\text{-}C_4)$alkyl, and —$O(C_2\text{-}C_4)$alkenyl;
m is 0, 1 or 2; n is 2, 3, 4, 5, 6; p is 2-10; and q is 0, 1 or 2. In an embodiment the photoinitiator is in an amount of 0.2 to 3% by weight and the scavenger is in an amount of 0.1 to 2% by weight.

However, in other applications, long term stability to oxidative resistance may be of benefit, for example in providing pipes with desirable mechanical properties over extended periods. Such pipes of the invention demonstrate improved long term stability when measured, for example, in the ASTM F 876 Stabilizer Functionality Test. For such pipes leaching is less of an issue but it is essential to include a photoinitiator, co-agent and antioxidant.

Thus another aspect of the invention provides a polymeric pipe formed from a polyolefin structural polymer, a photoinitiator in an amount of 0.02 to 2% by weight, a co-agent in an amount of 0.02-10% by weight, and an antioxidant in an amount of 0.1 to 1.5% by weight; wherein the photoinitiator is selected from benzophenone, benzophenone substituted at the 4-position and benzophenone substituted at the 4 and 4'-position; and wherein the co-agent comprises at least one carbon-carbon double bond. In an embodiment the photoinitiator is in an amount of 0.2 to 3% by weight and the co-agent is in an amount of 0.2-10% by weight.

Pipes of the invention may satisfy the NSF 61 requirements for low levels of leaching or long term stability chlorine resistance requirement according to ASTM F2023. In addition, pipes of the invention may satisfy both NSF 61 requirements for low levels of leaching and long term stability chlorine resistance requirement according to ASTM F2023.

We have found that the deliberate use of a twin extruder having co-rotating twin screws provides the necessary conditions for extruding plastics pipes which are more resistant to leaching of additives. In addition, the pipes of the invention demonstrate improved long term stability when measured, for example, in the ASTM F 876 Stabilizer Functionality Test. Furthermore, the process of the invention allows the production of PEX pipes at exceptionally high line speed relative to known processes, under very efficient production conditions. As discussed below, the process of the present invention can operate at line speeds of at least 20 m/min, for example in the range of 30-60 m/min, whilst still producing stable robust extruded pipe, for example for a ½" (1.27 cm) pipe as defined in the ASTM F876 standard for PEX tubing in North America.

Another aspect of the invention provides a method of producing a cross-linked polyolefin pipe comprising:
extrusion of a mixture from a co-rotating twin screw extruder to form an extruded pipe; and
cross-linking a polyolefin structural polymer by irradiating the extruded pipe with UV radiation,
wherein the extrusion mixture comprises the polyolefin structural polymer, a photoinitiator in an amount of 0.02 to 3% by weight and a scavenger in an amount of 0.01 to 2% by weight;
wherein the photoinitiator is a compound of formula I:

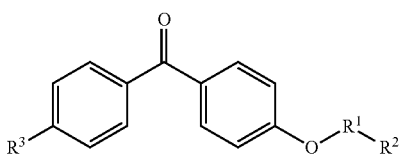

wherein:
$R^1$ is selected from —$(CH_2)_m(C=O)[O(CH_2)_n]_p(C=O)(CH_2)_q$—, —$(C=O)(C_5\text{-}C_{24}$ alkyl), and —$(C=O)(C_5\text{-}C_{24}$ alkenyl);
$R^2$ is selected from —H, —OH, -halo, —$(C_1\text{-}C_4)$alkyl, —$(C_2\text{-}C_4)$alkenyl, and formula II:

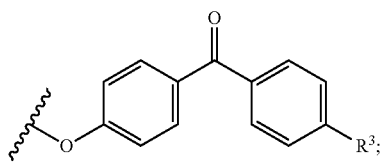

$R^3$ is selected from —H, -halo, —OH, —$(C_1\text{-}C_4)$alkyl, —$(C_2\text{-}C_4)$alkenyl, —$C(C_1\text{-}C_4)$alkyl, and —$O(C_2\text{-}C_4)$alkenyl;
m is 0, 1 or 2; n is 2, 3, 4, 5, 6; p is 2-10; and q is 0, 1 or 2. In an embodiment the photoinitiator is in an amount of 0.2 to 3% by weight and the scavenger is in an amount of 0.1 to 2% by weight.

A further aspect of the invention provides a method of producing a cross-linked polyolefin pipe comprising:
  extrusion of a mixture from a co-rotating twin screw extruder to form an extruded pipe; and
  cross-linking a polyolefin structural polymer by irradiating the extruded pipe with UV radiation,
  wherein the extrusion mixture comprises the polyolefin structural polymer, a photoinitiator in an amount of 0.02 to 3% by weight, a co-agent in an amount of 0.02-10% by weight, and a phenolic antioxidant in an amount of 0.1 to 1% by weight;
  wherein the photoinitiator is selected from benzophenone, bezophenone substituted at the 4-position and benzophenone substituted at the 4 and 4'-position; and
  wherein the co-agent comprises at least one carbon-carbon double bond. In an embodiment the photoinitiator is in an amount of 0.2 to 3% by weight and the co-agent is in an amount of 0.2-10% by weight.

The pipes of the invention may be used to convey fluids, for example drinking water or hot water. Accordingly, another aspect of the invention provides for the use of a pipe of the invention in a water transport system. An embodiment provides the use of a pipe of the invention in a drinking water transport system. Another embodiment provides use of a pipe of the invention in a hot water transport system.

BRIEF DESCRIPTION OF THE DRAWINGS

Embodiments of the invention are further described hereinafter with reference to the accompanying drawings, in which.

DETAILED DESCRIPTION

Figure 1:
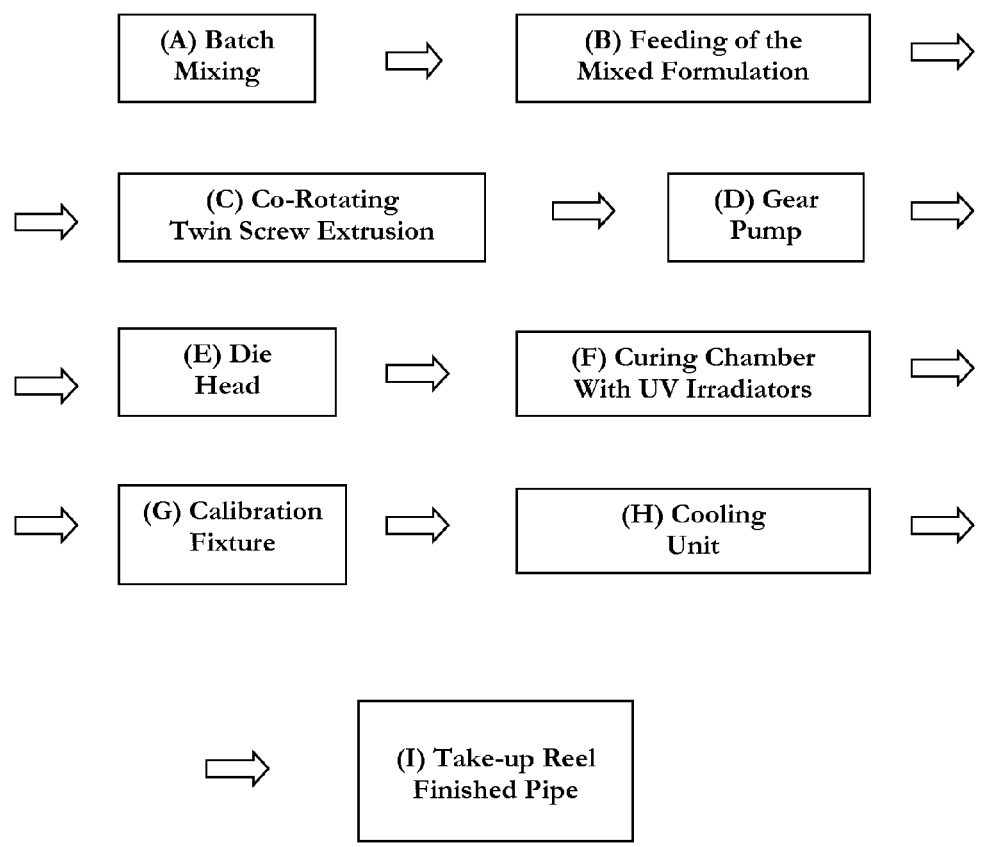
FIG. 1 is a flowchart illustrating a process for making pipes of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

For the avoidance of doubt, it is hereby stated that the information disclosed earlier in this specification under the heading "Background" is relevant to the invention and is to be read as part of the disclosure of the invention.

Polymeric pipes of this invention may be used for variety of applications, for example transport of hot and/or cold potable water, radiant floor heating, or waste water, as well as being used in fire sprinklers, process pipes in industries such as the food industry, and for conveying fluids other than water such as gases and slurries, among other uses. In some embodiments, these polymeric pipes include a base pipe with one or more layers disposed on the base pipe. Examples of various layers that may be disposed on a polymeric base pipe are included in US 2010/0084037, entitled "Methods and Compositions for Coating Pipe," which is incorporated by reference in its entirety. In other embodiments, the polymeric pipe includes the base pipe with no layers disposed on the base pipe, i.e. the pipe will consist of a single (i.e. one) layer.

Pipe Standards and Certifications

Pipe standards and standard test procedures referenced in the present disclosure include the following:

ASTM International Standard for Crosslinked Polyethylene (PEX) Tubing, F 876-10 (approved Feb. 1, 2010) ("ASTM F876");

ASTM International Standard Test Method for Evaluating the Oxidative Resistance of Crosslinked Polyethylene (PEX) Tubing and Systems to Hot Chlorinated Water, F2023-10 (approved Aug. 1, 2010) ("ASTM F2023");

ASTM International Standard Test Method for Obtaining Hydrostatic Design Basis for Thermoplastic Pipe Materials or Pressure Design Basis for Thermoplastic Pipe Products D2837-11 (approved Apr. 1, 2011) ("ASTM D2837");

ASTM Standard Test Method for Oxidative-Induction Time of Polyolefins by Differential Scanning calorimetry D 3859-98 (approved Jul. 10, 1998) ("ASTM D3895");

NSF International Standard/American National Standard for Drinking Water Additives 61-2011 (Jun. 10, 2011) ("NSF 61"); and

EN ISO 15875.

The contents of all of these standards are incorporated herein by reference.

The tests referred to herein are known standards in the industry and are available to the skilled person. We therefore only refer to them briefly in the interests of brevity. However, the content of these standards forms an integral part of the invention to the extent that the pipes according to the invention meet or exceed the requirements of the standards. Hence the content of these standards is explicitly incorporated into the present disclosure by reference.

Presently, PEX tubing in North America must meet temperature and pressure ratings requirements of 160 psi at 73.4° F. (23° C.), 100 psi at 180° F. (82.2° C.), and 80 psi at 200° F. (93.3° C.). Minimum burst ratings are at 475 psi at 73.4° F. (⅝ inch and larger). Additional performance characteristics and requirements for PEX pipes and tubing are given in ASTM F867.

ASTM F876 (North America) and EN ISO 15875 (Europe): Before product launch, any pipes have to pass all required testing in accordance with these two standards, respectively. The most time consuming and difficult requirements are mentioned specifically below.

Temperature/Pressure Ratings: According to NSF/PPI, pipes are only approved (for North America) if they pass 2,000 h of testing without damage. This test is conducted at higher temperature and pressures. Generally a pipe should not fail if it passes this condition but the pipe still needs to pass 16,000 h for completion.

Chlorine resistance is measured by ASTM F2023 and requires approximately 12-15 months of testing for completion.

A qualitative measure of the level of stabilisation may be provided by the oxidative-induction time (OIT) test, as performed in accordance with ASTM D3895.

Specific additives are typically needed for any application where polymers are utilized to create consumer products. For example, pipes for drinking water applications typically comprise stabilizers, anti-oxidants, crosslinking agents, processing additives, etc. as part of the final pipe composition, regardless of manufacturing method. These additives are typically necessary to provide pipes with desirable physical properties, e.g. pipes that satisfy ASTM F876 and/or EN ISO 15875 requirements. These chemical additives are, however, typically subject to leaching from the final chemical pipe. Leaching of chemicals into the pipe is, however, undesirable. In addition, for certain applications there are limits set on levels of leached chemicals. For example, NSF 61 sets limits on chemical leaching for drinking water pipes.

NSF 61 relates to the hygiene requirement and concerns the need to minimize chemical leaching from the finished pipes. Drinking water pipes in North America must pass the NSF 61 test. The purpose of this test is to assure the customer that the quality of the water inside the pipe is not compromised by chemicals leaching into it. There are three ways to complete this test: 1) single point test, 2) 21-Day multipoint test and 3) 107-Day multipoint test. All three tests involve changing the water inside the pipe every 24 hours over an extended period of time. For the single point test only the water extract on Day 17 is tested. For the multipoint tests the water extracts on several days are analyzed and the resulting data is then used to create a decay curve.

The water extracts are analyzed by a Gas Chromatograph equipped with a Mass Selective Detector (GC/MS). If deemed necessary other analytical techniques are also used. Twenty-four hours prior to collecting a sample for analysis some of the samples are heated at 82° C. for 30 minutes. The heated extracts are then analyzed by GC/MS for semi-volatile compounds using EPA624 method. The rest of the samples are conditioned at room temperature and then analyzed by GC/MS for volatile compounds using EPA524 method.

To pass the multipoint tests the concentration of all chemicals extracted into the water must decay to below the Short Term Exposure Limit (STEL) on Day 17 and Total Allowable Concentration (TAC) on Day 107. For the single point test both the STEL and TAC limits must be met on Day 17.

The allowance limits of NSF 61 were typically in the in the ppm range until recent years when the requirements have become more stringent, for example with the limits set in the ppb range for a number of compounds in current NSF standards.

The degree of crosslinking can be quantified in accordance with the following citation from ASTM F876:

"6.8. Degree of Crosslinking—When tested in accordance with 7.9, the degree of crosslinking for PEX tubing material shall be within the range from 65 to 89% inclusive. Depending on the process used, the following minimum percentages crosslinking values shall be achieved: 70% by peroxides (PEX-a), 65% by Azo compounds, 65% by electron beam (PEX-c), or 65% by silane compounds (PEX-b)".

Ideally, pipes should have a high, i.e. at least 50% (preferably at least 65%), level of cross-linking according to the standard. However, in some applications a lower degree of cross-linking may be acceptable.

The present invention is able to produce extruded pipes that consistently satisfy a defined target level of crosslinking (CCL) of, for example 73%, and importantly we have found that we are able to maintain it at that level at approximately 73±0.5% for a given formulation. In conventional prior art extrusion processes this variation is at least 3% and up to 5%, but can be many times higher.

The present invention provides a process for producing pipes that may have a high CCL, i.e. a CCL of at least 65% (e.g. of at least 70%) in a consistent and homogeneous manner, to satisfy or exceed the ASTM F876 standard. Pipes of the invention may satisfy the NSF 61 standard for residuals. Pipes of the invention may have a high CCL and also satisfy the NSF 61 standard for residuals.

Definitions

The following explanations of terms and methods are provided to better describe the present disclosure and to guide those of ordinary skill in the art in the practice of the present disclosure.

The terms "alkyl", "$C_1$-$C_{10}$ alkyl" and "$C_x$-$C_y$ alkyl" (where x is at least 1 and less than 10, and y is a number greater than 10) as used herein include reference to a straight or branched chain alkyl moiety having, e.g. 1, 2, 3, 4, 5, 6, 7, 8, 9 or 10 carbon atoms. The term includes reference to, for example, methyl, ethyl, propyl(n-propyl or isopropyl), butyl(n-butyl, sec-butyl or tert-butyl), pentyl, hexyl and the like. In particular, alkyl may be a "$C_1$-$C_6$ alkyl", i.e. an alkyl having 1, 2, 3, 4, 5 or 6 carbon atoms; or a "$C_1$-$C_4$ alkyl", i.e. an alkyl having 1, 2, 3 or 4 carbon atoms. The term "lower alkyl" includes reference to alkyl groups having 1, 2, 3 or 4 carbon atoms.

The terms "alkenyl", "$C_2$-$C_{10}$ alkenyl" and "$C_x$-$C_y$ alkenyl" (where x is at least 2 and less than 10, and y is a number greater than 10) as used herein include reference to a straight or branched chain alkyl moiety having, e.g. 2, 3, 4, 5, 6, 7, 8, 9 or 10 carbon atoms and having, in addition, at least one double bond, of either E or Z stereochemistry where applicable. This term includes reference to, for example, ethenyl, 2-propenyl, 1-butenyl, 2-butenyl, 3-butenyl, 1-pentenyl, 2-pentenyl, 3-pentenyl, 1-hexenyl, 2-hexenyl and 3-hexenyl and the like. In particular, alkenyl may be a "$C_2$-$C_6$ alkenyl", i.e. an alkenyl having 2, 3, 4, 5 or 6 carbon atoms; or a "$C_2$-$C_4$ alkenyl", i.e. an alkenyl having 2, 3 or 4 carbon atoms. The term "lower alkenyl" includes reference to alkenyl groups having 2, 3 or 4 carbon atoms.

The term "cycloalkyl" as used herein includes reference to an alicyclic moiety having 3, 4, 5, 6, 7 or 8 carbon atoms in a single ring. The cycloalkyl may be functionalised with a group such as an epoxide to produce a cycloalkyl epoxide. A group of this type will comprise two fused rings. The cycloalkyl may be functionalised with a group such as an isocyanate to produce a cycloalkyl isocyanate. Alternatively, the group may be a bridged or polycyclic ring system, more than one of which may be functionalised with epoxide. For example, a bridged or polycyclic ring system may comprise two rings, both of which are functionalised with epoxide. More often cycloalkyl groups are monocyclic. The term cycloalkyl includes reference to groups such as cyclopropyl, cyclobutyl, cyclopentyl, cyclohexyl, norbornyl, bicyclo [2.2.2]octyl and the like.

The terms "alkoxy" and "$C_1$-$C_6$ alkoxy" as used herein include reference to —O-alkyl, wherein alkyl is straight or branched chain and comprises 1, 2, 3, 4, 5 or 6 carbon atoms. In one class of embodiments, alkoxy has 1, 2, 3 or 4 carbon atoms. This term includes reference to, for example, methoxy, ethoxy, propoxy, isopropoxy, butoxy, tert-butoxy, pentoxy, hexoxy and the like. The term "lower alkoxy" includes reference to alkoxy groups having 1, 2, 3 or 4 carbon atoms.

The terms "halo" or "halogen" as used herein includes reference to F, Cl, Br or I. In a particular class of embodiments, halogen is F or Cl, of which F is more common.

Where a compound, moiety, process or product is described as "optionally" having a feature, the disclosure includes such a compound, moiety, process or product having that feature and also such a compound, moiety, process or product not having that feature. Thus, when a moiety is described as "optionally substituted", the disclosure comprises the unsubstituted moiety and the substituted moiety.

Where two or more moieties are described as being "independently" or "each independently" selected from a list of atoms or groups, this means that the moieties may be the same or different. The identity of each moiety is therefore independent of the identities of the one or more other moieties.

The term "CCL" refers to the crosslink density, typically expressed as a percentage. Throughout the description and claims of this specification, the phrases "degree of crosslinking", "level of crosslinking" and "crosslink density" or similar mean CCL.

Pipes

Unless indicated otherwise in this specification, any reference to a specific component (e.g. polyolefin structural polymer, photoinitiator, reactive extrusion species, co-agent, hindered amine light stabiliser, antioxidant, or any optional additive) in an amount of % by weight is a reference to the component as a % of its weight relative to the total weight of the layer of the pipe in which it is present.

Polymeric pipes of the invention comprise a polyolefin structural polymer. Although the structural polymer may be polyethylene (PE), those of ordinary skill in the art understand that various other structural polymers may be used in place of polyethylene. For example, the structural polymer may be a polyolefin such as PE (e.g., PE-raised temperature, or PE-RT), polypropylene (PP), polybutylenes (PB); any copolymers thereof; polyolefin copolymers such as poly (ethylene-co-maleic anhydride); among other polymers. For example, the structural polymer may be polyethylene, polypropylene, polybutylene, and higher olefinic polymers; copolymers of ethylene, propylene, 1-butene, 2-butene, 1-pentene, 1-hexene, 1-heptene and 1-octene and isomers thereof with each other and with other unsaturated monomers. Block copolymers and polymer blends of polymerised monomers of any of the abovementioned polymers are also included. The polymeric pipe may have at least 85% by weight polyolefin structural polymer, at least 90% by weight polyolefin structural polymer, or at least 95% by weight polyolefin structural polymer.

Preferred polyolefin structural polymers for use in the present invention include polyethylene, polypropylene, and mixtures thereof.

Polyethylene (PE) is classified into several different categories based mostly on its density and branching. The final product performance and mechanical properties depend significantly on variables such as the extent and type of branching, the crystallinity, the density, and the molecular weight and its distribution. As mentioned, PEX pipes are by far and most commonly manufactured from high density polyethylene (HDPE), however, this invention is applicable where any type of polyolefin or polyethylene is used for the production of single-layer or multi-layer plastic pipes such as, but not limited to, low density polyethylene (LDPE), medium density polyethylene (MDPE), PE 100, PE 80, PE-RT grades, and ultra-high molecular weight polyethylene (UHMWPE) or combinations thereof. Examples of commercially available PE that may be used in pipes of the present invention include Basell Q 456, Basell Q 456B, Basell New Resin, Basell Q 471, (all three of which are available from Equistar Chemicals, LP Lyondell Basell Company, Clinton Iowa, United States) Borealis HE 1878, Borealis HE 1878 E, Borealis HE 2550 (all three of which are available from Borealis AG).

The polymeric pipes of the invention may comprise cross-linked polyethylene (PEX) as the polyolefin structural polymer, in which case the pipe may be a PEX pipe. The structural polymer in such a pipe may comprise or consist of any of the varieties of polyethylene mentioned herein which has been crosslinked, preferably by the action of UV-radiation.

The pipes of the invention may be pipes, for example PEX pipes, that meet temperature and pressure ratings requirements of 160 psi at 23° C. (73.4° F.), 100 psi at 82.2° C. (180° F.), and 80 psi at 93.3° C. (200° F.). Minimum burst ratings are at 475 psi at 23° C. (73.4° F.) (⅝ inch and larger). PEX pipes of the invention may also meet additional performance characteristics and requirements set out in the ASTM F 876 approved Feb. 1, 2010, which is incorporated by reference in its entirety.

Polymeric pipes of the invention may comprise a photoinitiator, for example one or more photoinitiators; e.g. at least 1, at least 2, at least 3, at least 4 or at least 5 photoinitiators as defined herein. The photoinitiator may be present in an amount of 0.02 to 3% by weight, for example 0.2 to 3% by weight, e.g. the photoinitiator may be present in an amount of 0.2 to 2.5% by weight or 0.2 to 2% by weight. For example, the photoinitiator may be present in an amount of 0.3 to 1.5% by weight, 0.4 to 1.2% by weight, or 0.4 to 1% by weight; e.g. about 0.5% by weight, about 0.75% by weight or about 1% by weight.

The photoinitiator has an important role in crosslinking the polyolefin structural polymer. The photoinitiator may be selected from the class of "Type II free radical Photoinitiators". Exemplary Type II photoinitiators include benzophenone and its derivatives, thioxanthone and its derivatives, anthraquinone and its derivatives, camphorquinone, benzyl, and dibenzosuberenone.

Type II photoinitiators undergo a bimolecular reaction where the excited state of the photoinitiator normally interacts with a second molecule (co-initiator) to generate free radicals. The excited state can also abstract hydrogens from the surrounding polymer matrix, e.g., from a polyethylene polymer backbone, to induce and complete the necessary crosslinking, as being relevant in the present invention.

The photoinitiator may be benzophenone or a benzophenone derivative. For example, the photoinitiator may be selected from one or more of benzophenone, benzophenone substituted at the 4-position and benzophenone substituted at the 4 and 4'-position. When such a photoinitiator is used, the crosslinking process involves a radical mechanism to facilitate crosslinking. This process is illustrated below for the photoinitiator benzophenone and PE and comprises the steps of initiation, hydrogen abstraction and crosslinking.

Initiation:

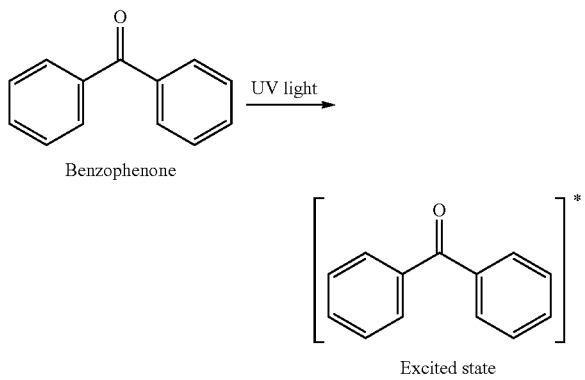

Hydrogen abstraction from the polyethylene chain:

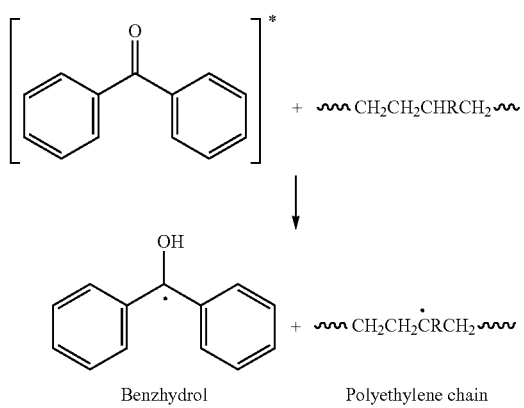

Crosslinking to form a crosslinked polymer network (in this example PEX):

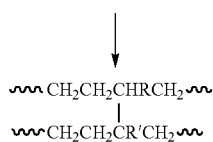

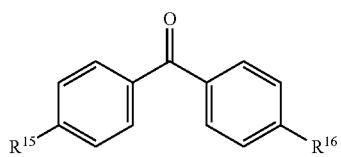

The photoinitiator may be a benzophenone substituted at the 4-position or 4 and 4'-position of the following formula:

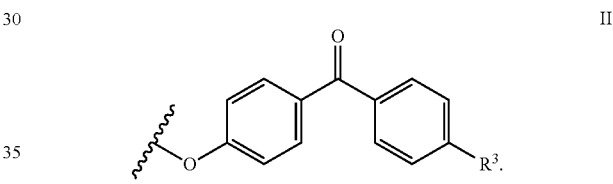

$R^{15}$ is selected from the group comprising —H, -halo, —OH, —($C_1$-$C_{10}$)alkyl, —($C_2$-$C_{10}$)alkenyl, —O($C_1$-$C_{10}$)alkyl, and —O($C_2$-$C_{10}$)alkenyl.

In an embodiment, $R^{15}$ is selected from the group comprising —H, -halo, —OH, —($C_1$-$C_4$)alkyl, —($C_2$-$C_4$)alkenyl, —O($C_1$-$C_4$)alkyl, and —O($C_2$-$C_4$)alkenyl. $R^{15}$ may be selected from -halo (e.g. —F or —Cl), —($C_1$-$C_4$)alkyl (e.g. -methyl or -ethyl), and —O($C_1$-$C_4$)alkyl (e.g. -methoxy or -ethoxy). $R^{15}$ may be H, in which case the benzophenone is not substituted at the 4'-position, i.e. the photoinitiator is a benzophenone substituted at the 4-position.

$R^{16}$ is selected from the group comprising -halo, —OH, —($C_1$-$C_{30}$)alkyl, —($C_2$-$C_{30}$)alkenyl, —O($C_1$-$C_{30}$)alkyl, —O($C_2$-$C_{30}$)alkenyl, —O(C=O)($C_1$-$C_{30}$)alkyl, —O(C=O)($C_2$-$C_{30}$)alkenyl, and —O—$R^1$—$R^2$.

In an embodiment, $R^{16}$ is selected from the group comprising -halo, —OH, —($C_1$-$C_{20}$)alkyl, —($C_2$-$C_{20}$)alkenyl, —O($C_1$-$C_{20}$)alkyl, —O($C_2$-$C_{20}$)alkenyl, —O(C=O)($C_1$-$C_{20}$)alkyl, —O(C=O)($C_2$-$C_{20}$)alkenyl and —O—$R^1$—$R^2$. For example, $R^{16}$ may be selected from —($C_1$-$C_{10}$)alkyl, —($C_2$-$C_{10}$)alkenyl, —O($C_1$-$C_{10}$)alkyl, —O($C_2$-$C_{10}$)alkenyl and —O—$R^1$—$R^2$.

$R^1$ is selected from the group comprising —$(CH_2)_m$(C=O)[O$(CH_2)_n]_p$(C=O)$(CH_2)_q$—, —(C=O)($C_5$-$C_{24}$ alkyl), and —(C=O)($C_5$-$C_{24}$ alkenyl).

In an embodiment, $R^1$ is selected from the group comprising —$(CH_2)_m$(C=O)[O$(CH_2)_n]_p$(C=O)$(CH_2)_q$— or —(C=O)($C_5$-$C_{24}$ alkyl). $R^1$ may be —$(CH_2)_m$(C=O)[O$(CH_2)_n]_p$(C=O)$(CH_2)_q$—, $R^1$ may be —(C=O)($C_5$-$C_{24}$ alkyl).

$R^2$ is selected from the group comprising —H, —OH, -halo, —($C_1$-$C_4$)alkyl, —($C_2$-$C_4$)alkenyl, and formula II:

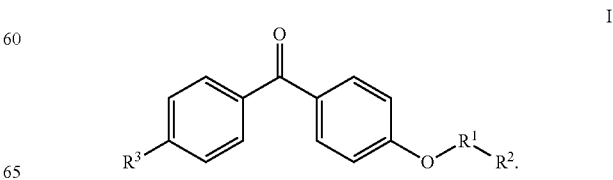

II $R^2$ may be selected from —H, -halo, —($C_1$-$C_4$)alkyl and formula II. For example, $R^2$ may be —H or of formula II. For example, $R^2$ may be H.

In an embodiment, $R^2$ may be of formula II.

$R^3$ is selected from the group comprising —H, -halo, —OH, —($C_1$-$C_4$)alkyl, —($C_2$-$C_4$)alkenyl, —O($C_1$-$C_4$)alkyl, and —O($C_2$-$C_4$)alkenyl.

$R^3$ may be selected from —H, -halo, and —OH. $R^3$ may be —H.

In an embodiment, $R^3$ may be —($C_1$-$C_4$)alkyl. For example, $R^3$ may be —O($C_1$-$C_4$)alkyl.

m is 0, 1 or 2. Preferably, m is 0 or 1.
n is 2, 3, 4, 5, 6. Preferably, n is 3, 4 or 5.
p is 2-10. Preferably, p is 4, 5, 6, 7 or 8.
q is 0, 1 or 2. Preferably, q is 0 or 1.

For example, m and q may both be 1 and/or m and q may both be 0. For example, n may be 3, 4 or 5 (e.g. 4) and p may be 3, 4, 5 or 6.

The photoinitiator may thus be a compound of formula I:

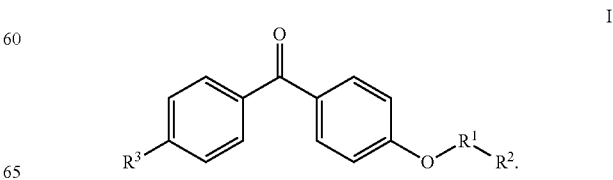

I $R^1$, $R^2$, and $R^3$ are as previously defined.

Examplary benzophenones of use in the present invention are disclosed in EP0490854 A2, which is specifically incorporated by reference in its entirety and the initiators used in that document are intended to form part of this invention.

Oligomeric/polymeric benzophenones are preferred, as these may result in less leaching of photoinitiator residues into fluid contained within the pipe.

The photoinitiator may be a compound selected from benzophenone, 4-hydroxybenzophenone laurate, 4-hydroxybenzophenone stearate, 4-chloro-4'-hydroxybenzophenone laurate, 4-chloro-4'-hydroxybenzophenone stearate, 4,4'-dimethylbenzophenone, 4,4'-dimethoxybenzophenone, 4-chlorobenzophenone, 4-fluorobenzophenone, 4-fluoro-4'-hydroxybenzophenone, 4,4'-diallyloxybenzophenone, Omnipol BP, and Genopol BP. Omnipol BP is the compound:

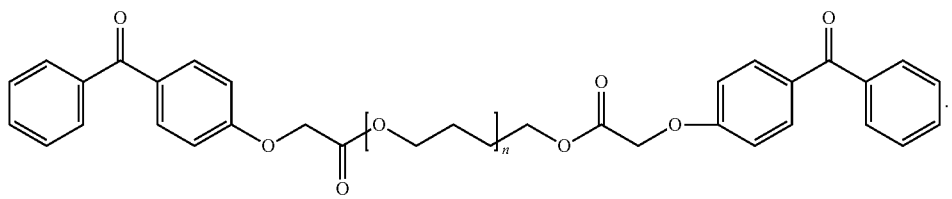

Genopol BP is the compound:

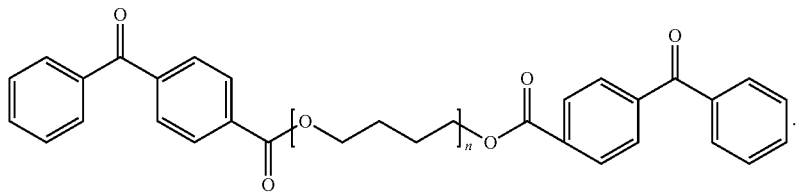

For example, when the photoinitiator is Omnipol BP a satisfactory crosslinking value is obtained for the polyolefin polymer and we can meet the NSF 61 requirement for residuals, e.g. when used in a pipe of the invention comprising a scavenger.

Polymeric pipes of the invention may comprise a scavenger, for example one or more scavengers; e.g. at least 1, at least 2, at least 3, at least 4 or at least 5 scavengers as defined herein. The scavenger may be a reactive extrusion species or nanoparticles, or a mixture of two or more reactive extrusion species and/or nanoparticles. The reactive extrusion species may be a mono- or multi-functional isocyanate (e.g. an alkyl isocyanate, aryl isocyanate, cycloalkyl isocyanate, oligomeric isocyanate, and/or polymeric isocyanate), or it may be an epoxide or mixture thereof. The scavenger (or total amount of scavengers) may be present in an amount of 0.01 to 5% by weight. For example, the scavenger may be present in an amount of 0.2 to 1% by weight, 0.3 to 0.7% by weight, e.g. about 0.5% by weight.

Without being bound by any theory, it is thought that migration and leaching of any residues of the photoinitiator remaining after crosslinking from the polymeric pipe is substantially reduced by interaction with the scavenger. Where the scavenger is a reactive extrusion species, the interaction is based on a reaction. For example, where the reactive extrusion species is an alkyl isocyanate, the alkyl isocyanate is able to react with a hydroxyl group of a photoinitiator or a hydroxyl group residue of a photoinitiator to form a covalent linkage. For example, an alkyl isocyanate would react with hydroxybenzophenone to form a urethane linkage between the alkyl group of the isocyanate and the benzophenone. Similarly, when the reactive extrusion species is an epoxide (e.g. a cycloalkyl epoxide) the epoxy moiety may react with an appropriate substituent of the photoinitiator (or residue of the photoinitiator) to form a covalent linkage.

Without wishing to be bound by any theory, it is believed that the alkyl or cycloaliphatic groups of the reactive extrusion species contribute to reduced leaching from the polymer matrix of the residues after reaction to form a covalent linkage. For example, it is believed that the alkyl or cycloaliphatic groups of the reactive extrusion species provide a portion of the compound that is compatible with a polyolefin structural polymer (e.g. a polyethylene). This compatibility provides a level of miscibility and homogeneity in the polymer blend that prevents the leaching of the reactive extrusion species and any bound residues out of the pipe.

The reactive extrusion species may comprise (or be) an alkyl isocyanate, cycloalkyl isocyanate, an oligomeric isocyanate, and/or polymeric isocyanate. An alkyl isocyanate or cycloalkyl isocyanate may be a monofunctional or multi-functional isocyanate, e.g. may be a diisocyanate. The isocyanate may comprise an alkyl isocyanate, e.g. ($C_6$-$C_{30}$ alkyl)NCO or e.g. OCN($C_6$-$C_{30}$ alkyl)NCO. The alkyl may be a straight chain or branched. The alkyl isocyanate may be a $C_{12}$, $C_{13}$, $C_{13}$, $C_{14}$, $C_{15}$, $C_{16}$, $C_{17}$, $C_{18}$, $C_{19}$, $C_{20}$, $C_{21}$ or $C_{22}$ alkylisocyanate, e.g. octadecylisocyanate. The isocyanate may comprise a cycloalkyl isocyanate, for example isophorone diisocyanate. The isocyanate may comprise a polymeric isocyanate, e.g. a polymeric isocyanate based on hexamethylene diisocyanate and/or isophorone diisocyanate. Mixtures of isocyanates may be used in the present invention. Exemplary isocyanates include octadecyl isocyanate, trans-cyclohexane diisocyanate (e.g. available from DuPont), Krasol NN32 (9% NCO, MDI based, available from Cray Valley, Exton, Pa., USA); and Desmodur polyisocyanates available from Bayer Material Science (e.g. Desmodur W, BL 3175A, 4265 SN, DA-L, DN, HL BA, I, N 100, N 3200, N 3300A, N 3400, N 3600, XP 2617 and H).

Examples of isocyanates useful in the present invention are methylene diphenyl diisocyanate (MDI); Desmodur® W (hydrogenated MDI); monomeric toluene diisocyanate (TDI) based derivatives such as Desmodur® T65N, Desmodur® T80, Desmodur® T100; and L 67 MPA/X, L 67 BA (isocyanurate), L 1470 (isocyanurate), IL BA (isocyanurate), IL EA (isocyanurate), IL 1351 (isocyanurate), IL 1351 EA (isocyanurate), IL 1451 (isocyanurate), IL 1451 EA (isocyanurate), HL BA (isocyanurate), HL EA (isocyanurate); and prepolymers based on TDI such as Desmodur® E 15, Desmodur® E 14, Desmodur® E 1361 MPA/X, Desmodur® E 1361 BA, Desmodur® E 1160, Desmodur® E 1750 PR, Desmodur® E 1660, Desmodur® E XP 2606; and monomeric diphenylmethane diisocyanate (MDI) products such as Desmodur® 44M, Desmodur® 44MC, Desmodur® 44MN, Desmodur® LS2424, Desmodur® 2460M, Desmodur® CD-S, Desmodur® CD-L, and polymeric MDI products such as Desmodur® VK5, Desmodur® VK10, Desmodur® VK10L, Desmodur® VLR10, Desmodur® VKS20, Desmodur® VKS20F, Desmodur® VKS20FH, Desmodur® XP2404, Desmodur® 44V70L; and Desmodur polymeric MDI products such as VL, VL50, VL51, VLR10, VLR20, VLR21, XP2551; and prepolymers based on MDI such as Desmodur® VH20N, Desmodur® E29, Desmodur® PF, Desmodur® EXP2753, Desmodur® E21, Desmodur® XP2665, Desmodur® E20100, Desmodur® EXP2723, Desmodur® E23, Desmodur® EXP2727, Desmodur® EXP2715, Desmodur® E2200176, Desmodur® E22, Desmodur® EXP2726, Desmodur® M280, AND Desmodur® VPLS2397; and aliphatic isocyanates such as Desmodur® H, Desmodur® I, Desmodur® W/1; and Desmodur® N-HDI-BASED-BIURET isocyanates such as N100, N75MPA/X, N75MPA, N75BA, N3200; and Desmodur® N-HDI-BASED-TRIMER isocyanates such as N3300, N3390BA/SN, N3390BA, N3600, N3790BA, N3800, N3900, XP2675, XP2580, N3400, XP2730, XP2679, XP2714; and Desmodur® Z-IPDI-BASED-BIURET isocyanates such as Z4470SN, Z4470MPA/X, Z4470BA, XP2565, XP2489, NZ1; and pre-polymers based on aliphatic isocyanates such as Desmodur® EXP2747, Desmodur® E305, Desmodur® XP2617, Desmodur® XP2599, Desmodur® E3265MPA/SN, Desmodur® E3370, Desmodur® VPLS2371, Desmodur® XP2406; and BAYHYDUR polyisocyanates such as 3100, 304, 305, 401-70, XP2451, XP2487/1, XP2547, XP2655, XP2700, XP2759; and Desmodur® D based polyisocyanates such as DA-L and DN; and Desmodur® R materials such as RC, RN, RE, RFE; and Desmodur® BL blocked polyisocyanates such BL1100/1, BL1265MPA/X, BL3175SN, BL4265SN, BL5375, BL3575/1, PL350, PL340, BL3370MPA, BL3475BA/SN, BL3272MPA, VPLS2078/2, Desmocap® 11, Desmocap® 1190, Desmocap® 12, BL5140, BL2805XP, BL5335, VPLS2310, BL2781XP, BLXP2706, BL2810XP; and BAYTHERM resins such as 3146, 2782XP; and Crelan® blocked isocyanates such as EF403, UI, NI-2, VPLS2256, and NW-5; all of which are available from Bayer Materials Science. Examples of further isocyanates useful in the present invention are Rubinate M, Rubinate 5025, Rubinate 1245, Rubinate 1820, Rubinate 9016, Rubinate 9257, Rubinate 44, Rubinate 1680, Rubinate 9447, Rubinate 9480, Rubinate 9495, Rubinate 9009, Rubinate 9259, Rubinate 9041, Rubinate 9236, Rubinate 9040, Rubinate 9272, Rubinate 9511, Rubinate 9234, Rubinate 9271, Rubinate 1790, Rubinate 1670, Rubinate 1209, Rubinate 9465, Rubinate 1234; Suprasec 5025, Suprasec 9615, Suprasec 9582, Suprasec 9602, Suprasec 2004, Suprasec 9150, Suprasec 9561, Suprasec 9603, Suprasec 9608, Suprasec 9616, Suprasec 9611, Suprasec 9584, Suprasec 9610, Suprasec 2496, Suprasec 9600, Suprasec 9577, Suprasec 2029, Suprasec 7316, Suprasec 7507, and Suprasec 9612; all of which are available from Huntsman Corporation, Michigan, USA.

The reactive extrusion species may comprise (or be) an epoxide or another cyclic ether derivative (e.g. an oxetane); for example a cycloalkyl epoxide or a cycloalkyl ether derivative (e.g. a cycloalkyl oxetane). Illustrative of the cycloaliphatic epoxides useful as in the present invention are 3,4-epoxycyclohexylmethyl-3,4-epoxycyclohexane carboxylate, bis-(3,4-epoxycyclohexyl)adipate, methyl 3,4-epoxy-cyclohexane-carboxylate, ethyl 3,4-epoxycyclohexane-carboxylate, propyl 3,4-epoxycyclohexane-carboxylate, isopropyl 3,4-epoxycyclohexane-carboxylate, n-butyl-, s-butyl-, and t-butyl 3,4-epoxycyclohexane-carboxylate; the various amyl and hexyl 3,4-epoxycyclohexane-carboxylates, methyl 3,4-epoxy-3-methyl-cyclohexane carboxylate, ethyl 3,4-epoxy-3-methyl-cyclohexane carboxylate, methyl 3,4-epoxy-4-methyl-cyclohexane carboxylate, ethyl 3,4-epoxy-4-methyl-cyclohexane carboxylate, butyl 3,4-epoxy-3-methyl-cyclohexane carboxylate, butyl 3,4-epoxy-4-methyl-cyclohexane carboxylate, methyl 3,4-epoxy-6-methyl-cyclohexane carboxylate, ethyl 3,4-epoxy-6-methyl-cyclohexane carboxylate, butyl 3,4-epoxy-6-methyl-cyclohexane carboxylate, dialkyl 4,5-epoxycyclo-hexane-1,2-dicarboxylates, as well mixed dialkyl 4,5-epoxycyclohexane-1,2-dicarboxylates, and the like. Mixtures of cycloaliphatic epoxides and/or cyclic ethers can be employed. Another epoxide that may be used as a reactive extrusion species is allyl glycidyl ether.

The scavenger may comprise (or be) nanoparticles, for example inorganic nanoparticles. Nanoparticles are defined as materials having one dimension below 200 nm. Without being bound by any theory, it is believed that nanoparticles may act to adsorb residues of the photoinitiator or other polar components, thereby leading to reduced leaching of photoinitiator residues from the polymer matrix into any fluid (for example water) that is resident in the pipe. The improved results obtained using nanoparticles may be due in part to their extremely high aspect ratio compared to conventional fillers.

Especially suitable nanoparticles can be derived from inorganic materials, for example, nano-clays (e.g. intercalated and exfoliated (delaminated) clays (layered silicates)), calcium carbonate, calcium phosphate, aluminium oxide, silicon carbide SiC (nanowhiskers) and silica $SiO_2$. Preferably at least 50% of the nanoparticles are less than about 20 layers thick, the layers of the nanoparticles having a unit thickness of from about 0.7 nm to 1.2 nm.

The nanoparticles may be layered silicates. Polymer-layered silicate composites can be divided into three general types: composites where the layered silicate acts as a normal filler, intercalated nanocomposites consisting of a regular insertion of the polymer material in between the silicate layers and exfoliated nanocomposites where 1 nm-thick layers are dispersed in the polymer material forming a monolithic structure on the microscale. All three types can be used in the pipes of the present invention. Layered silicates are believed to be especially beneficial in polymer compositions in accordance with the invention due to their large surface area in comparison with some other nanoparticles.

Any suitable layered silicate nanoparticles may be used as nanoparticles in the plastics pipe of the invention. In this specification, the term "layered silicates" includes natural clays and minerals, for example, montmorillonite and talc, and also synthesized layered silicates such as magadiite, mica, laponite, and fluorohectorite. These layered silicates may be subjected to various surface treatments with organic wetting or coating agents as appropriate to introduce pendant polar groups. Mixtures of different layered silicates, and mixtures of layered silicates with other nanoparticles, may also be used.

Examples of suitable nanoparticles include montmorillonites, such as Cloisite 6A and Cloisite 15A (sodium montmorillonite modified with a quaternary ammonium salt) manufactured by Southern Clay Products. Further examples of suitable nanoparticles include aluminium oxide particles and/or a nanoclay such Nanomer 1.31 PS, surface modified nanoclay (Aldrich product No. 682632, available from Sigma-Aldrich, St-Louis, Mo., USA on Jan. 4, 2013).

Polymeric pipes of the invention may comprise a co-agent, for example one or more co-agents; e.g. at least 1, at least 2, at least 3, at least 4 or at least 5 co-agents as defined herein. The selected co-agents (monomers and/or oligomers) used in the formulations in the present invention comprise at least one polymerizable double bond or reactive group. The co-agent provides additional crosslinks between the polyolefin chains of the polyolefin structural polymer. The co-agent thus acts to promote and enhance the efficiency of the crosslinking process, e.g. where the polyolefin structural polymer is polyethylene the co-agent enhances the crosslinking of the polyethylene chains to produce PEX. The co-agent (or total amount of co-agents) may be present in an amount of 0.02 to 10% by weight. For example, the co-agent may be present in an amount of 0.1 to 5% by weight, 0.2 to 1% by weight, 0.3 to 0.7% by weight, e.g. about 0.5% by weight.

The co-agent may be selected from co-agents comprising reactive groups such as acrylates, allyl ethers, polybutadienes, vinyl ethers, and also unsaturated vegetable oils, such as soybean oil. For example, the co-agent may be selected from acrylates, allyl ethers, polybutadienes and vinyl ethers. The co-agent may comprise a reactive carbon-carbon double bond. A reactive carbon-carbon double bond may be a carbon-carbon double bond that is a terminal carbon-carbon bond. A reactive carbon-carbon double bond may be a carbon-carbon double bond where one of the carbon atoms comprises two geminal hydrogen atoms.

The co-agent may comprise multiple double bonds. We have discovered that this enhances the level of crosslinking. Preferred co-agents comply with NSF 61 requirements. Polymeric co-agents such as polybutadienes, or any polymer backbone containing unsaturated moieties may be used within the framework of the present invention, and will typically comply with NSF 61 requirements when used in pipes of the invention.

For example, a wide variety of acrylates can be used as co-agents, and include: 1,6-hexanediol diacrylate, 1,3-bytylene glycol diacrylate, diethylene glycol diacrylate, trimethylolpropane triacrylate, neopentyl glycol diacrylate, polyethylene glycol 200 diacrylate, tetraethylene glycol diacrylate, triethylene diacrylate, pentaerythritol tetraacrylate, tripropylene glycol diacrylate, ethoxylated bisphenol-A diacrylate, propylene glycol (mono)dimethacrylate, trimethylolpropane diacrylate, di-trimethylolpropane tetraacrylate, triacrylate of tris(hydroxyethyl) isocyanurate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate, pentaerythritol diacrylate, aminoplast(meth)acrylates, acrylated oils such as linseed, soy bean oil, castor oil, etc. Other applicable polymerizable compounds include methacrylamides, maleimides, vinyl acetate, vinyl caprolactam, thiols and polythiols. Styrene derivatives are also readily applicable within the framework of this invention.

The co-agent may be an oligomer or a pre-polymer. For example, the co-agent may be an oligomer or a pre-polymer having acrylate functionality, e.g. selected from polyurethane acrylates, epoxy acrylates, silicone acrylates, and polyester acrylates. Other exemplary co-agents include (meth)acrylated epoxies, (meth)acrylated polyesters, (meth)-acrylated silicones, (meth)acrylated urethanes/polyurethanes, (meth)acrylated polybutadiene, (meth)acrylated acrylic oligomers and polymers, and the like, and any combinations thereof. A preferred co-agent is an oligomer or pre-polymer that is a polyurethane acrylate, for example a Krasol NN prepolymer (available from Cray Valley, Inc., Exton, Pa., USA).

For example, we used polybutadiene-Ricon 152 and obtained a CCL value of 80% and a pass for the NSF 61 test and a clear pipe in terms of colour. Similarly we used trimethylolpropane triacrylate (TMPTA) and obtained an acceptable CCL value and a pass for the NSF 61 test and a clear pipe in terms of colour.

Further examples of co-agents of use in the invention include the following:

Triallylcyanurate

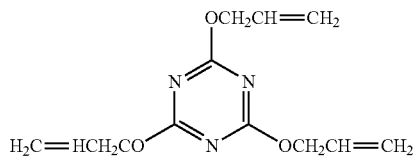

Polybutadiene

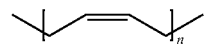

wherein n is selected such that the average molecular weight is from about 2,000 to about 10,000 g/mol, preferably from about 4,000 to about 7,000 g/mol, e.g. the average molecular weight may be 3,000 or 5,000 g/mol.

Hydroxy terminated and epoxidized polybutadiene (Poly BD 600E)

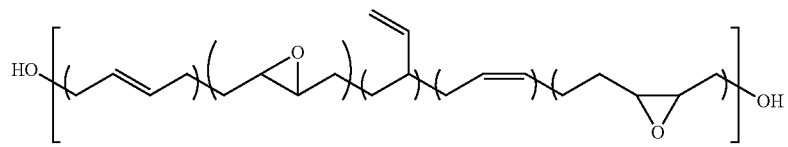

having an average molecular weight of about 2,100 g/mol.

Polybutadiene-Ricon

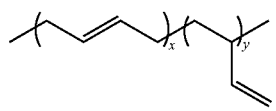

wherein x and y are selected such that the average molecular weight is from about 1,000 to about 10,000 g/mol, preferably from about 2,000 to about 7,000 g/mol. For example, Polybutadiene-Ricon 142 of average molecular weight 4,100 g/mol (CAS #9003-17-2). Polybutadiene-Ricon 152 of average molecular weight 2,900 g/mol (CAS #9003-17-2). Polybutadiene-Ricon 156 of average molecular weight 2,900 g/mol. Polybutadiene-Ricon 157 of average molecular weight 1,800 g/mol.

Trimethylolpropane triacrylate (TMPTA)

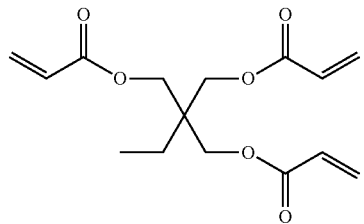 [SMILES: C=CC(=O)OCC(CC)(COC(=O)C=C)COC(=O)C=C]

Poly(ethylene glycol)diacrylate (CAS #: 26570-48-9)

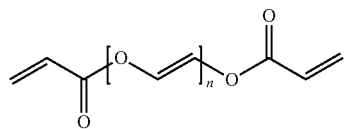

where n is selected such that the average molecular weight is about 575 g/mol.

Polybutadiene diacrylate (CAS #: 9003-17-2) of average molecular weight 2,200 g/mol.

Krasol® NN polyurethane prepolymer (available from Cray Valley, Inc., Exton, Pa., USA), for example Krasol® NN 32 (9% NCO, MDI based, 56% vinyl content, viscosity of 12,000 Cps at 25° C. and/or Krasol® NN 35.

Polymeric pipes of the invention may comprise a hindered amine light stabilizer (HALS), for example one or more HALS; e.g. at least 1, at least 2, at least 3, at least 4 or at least 5 HALS as defined herein. HALS are compounds in which an amine group is sterically hindered by adjacent functional groups. The physical properties of structural polymers such as PE may tend to degrade over time when exposed to ultraviolet (UV) wavelengths of light. The use of HALS in the polymer blend interferes with this degradation and facilitates the maintenance of the structural polymer properties over time. The total amount of HALS (e.g., any one or more of the HALS described herein) may be from 0.05 to 1% by weight, from 0.05 to 0.5% by weight, from 0.07 to 0.3% by weight, from 0.1 to 0.25% by weight, or from 0.1 to 0.2% by weight; or about 0.1% by weight, or about 0.15% by weight.

Exemplary HALS are described in WO 2010/138816 A1, which is incorporated by reference in its entirety. For example, WO 2010/138816 A1 discloses, at paragraph [0050] on pages 15 to 17, HALS that may be used in the pipes of the invention.

The HALS may comprise a piperidine group. In some such embodiments, the HALS may be a compound of the following formula:

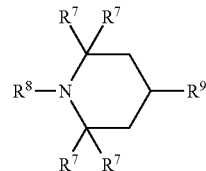

Each $R^7$ and $R^8$ may be hydrogen or a $C_1$-$C_{30}$ saturated or unsaturated aliphatic moiety. $R^9$ may be a $C_2$-$C_{30}$ saturated or unsaturated straight, branched or cyclic aliphatic moiety such as a hydrocarbon (consisting only of carbon and hydrogen), an ester, an ether, or other suitable functional group.

In some embodiments, at least one of the $R^7$ groups at each of the 2 and 6 positions is a $C_1$-$C_{30}$ saturated or unsaturated straight, branched or cyclic aliphatic moiety, while in other embodiments both of the $R^7$ groups at each of the 2 and 6 positions is a $C_1$-$C_{30}$ saturated or unsaturated straight, branched or cyclic aliphatic moiety. In one example, one or both of the $R^7$ groups at the 2 and 6 positions in the piperidine ring are alkyl groups (e.g., a methyl or ethyl group), and $R^8$ is a hydrogen, methyl or ethyl group.

$R^9$ may be a long chain ($C_6$ or greater, $C_8$ or greater, $C_{12}$ or greater, or $C_{16}$ or greater) straight or branched aliphatic functional group, at least a portion of which is compatible with a nonpolar polyolefin structural polymer such as PE. $R^9$ may include an alicyclic structure such as a second piperidine ring. Where $R^9$ includes a piperidine ring, a portion of $R^9$ may act as a bridge between two piperidine rings. In some such embodiments, the bridge between the two piperidine rings may be a saturated aliphatic moiety or an unsaturated aliphatic moiety (e.g., it may contain a C—C double bond such as methylene). In addition, $R^9$ may also be included at other positions on the piperidine ring, for example at any one, any two, or at all three of, the 3, 4 and 5 positions on the piperidine ring.

$R^9$ may be an ester of formula $-R^{10}C(O)OR^{11}$ or $-R^{11}C(O)OR^{10}$ may be either) the piperidine ring (where the ester moiety is attached directly to the piperidine ring) or an additional functional group (e.g., a $C_1$-$C_{30}$ saturated or unsaturated aliphatic functional group) that functions as a bridging group between the ester moiety and the piperidine ring. $R^{11}$ may be a $C_2$-$C_{30}$ saturated or unsaturated carbon-containing moiety, for example an aliphatic function group (e.g., a straight, branched or cyclic aliphatic group). $R^{11}$ together with the carbon atom of the ester moiety may form a $C_2$-$C_{30}$ saturated or unsaturated ester.

Further examples of HALS of use in the present invention are the following:

Cyasorb 3853, which may represented by formula

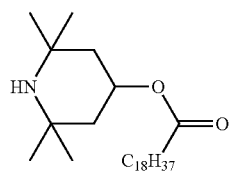

which has a molecular weight of 379 g/mol.

Chimassorb 944LD, which may be represented by formula

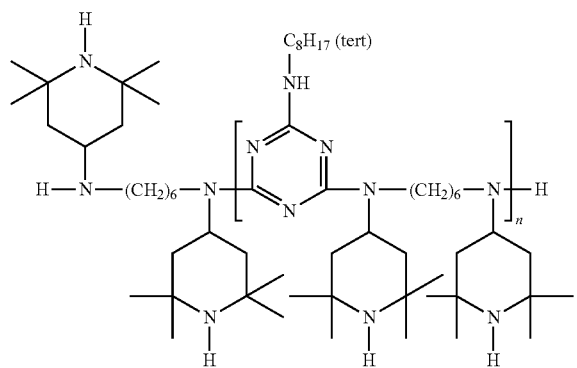

which has a molecular weight of 2000 to 3100 g/mol.

Tinuvin 770, which may be represented by formula

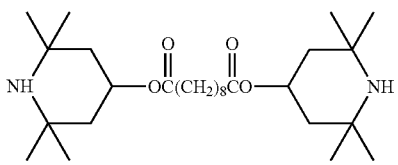

which has a molecular weight of 481 g/mol.

Tinuvin 622, which may be represented by formula

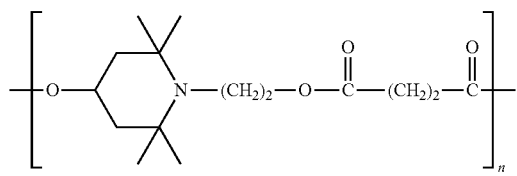

which has a molecular weight of 3100 to 4000 g/mol.

Without being bound by any theory, it is believed that the structure of the HALS of the invention contributes to reduced leaching from the polymer matrix. For example, it is believed that the relatively long chain fatty acid portions that do not act as bridging groups in the HALS Cyasorb 3853 provide a portion of the compound that is compatible with a polyolefin structural polymer (e.g. a polyethylene). This compatibility provides a level of miscibility and homogeneity in the polymer blend that both improves the burst strength of the finished pipe and prevents and/or reduces the leaching of the Cyasorb 3853 into any water that is resident within the pipe.

Polymeric pipes of the invention may comprise an antioxidant, for example one or more phenolic antioxidants; e.g. at least 1, at least 2, at least 3, at least 4 or at least 5 antioxidants as defined herein. Antioxidants may be used to preserve the polymer blend during the production process, for example when the polymer blend is exposed to the elevated heat and pressure of the extrusion process. Specifically, the mechanical properties of some structural polymers, such as PE, will tend to deteriorate due to oxidative degradation when exposed to heat and pressure. For example, in some cases the deterioration will evidence as the formation of shorter chains, effectively decreasing the average molecular weight of the structural polymer and changing the characteristics of the structural polymer. Antioxidants act to prevent or limit such deterioration.

Antioxidants may also facilitate the maintenance of pipe properties over time, especially when the pipe is exposed to chlorine or other oxidizing agents. In one example, a fluid (e.g. potable water) that is present in the pipe may contain oxidizing agents such as chlorine, which over time may tend to oxidize and break down a structural polymer such as PE. Such oxidation may cause degradation in the properties of the structural polymer and the finished pipe. In some examples, antioxidants tend to preserve the properties of the structural polymer in the presence of an oxidative environment. The total amount of antioxidant (e.g., any one or more of the antioxidants described herein) may be from 0.1 to 1% by weight, from 0.25 to 0.75% by weight, from 0.2 to 0.6% by weight, from 0.38 to 0.57% by weight, or about 0.5 wt %.

Suitable antioxidants include phenolic antioxidants. Examples of such antioxidants are described in WO 2010/138816 A1, which is incorporated by reference in its entirety. For example, WO 2010/138816 A1 discloses, at paragraph [0048] on pages 12 to 14, antioxidants that may be used in the pipes of the invention. Exemplary antioxidants that may be used in the polymeric pipes of the invention include:

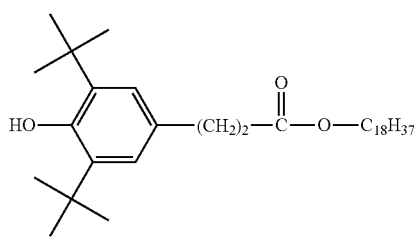

Irganox 1076

-continued

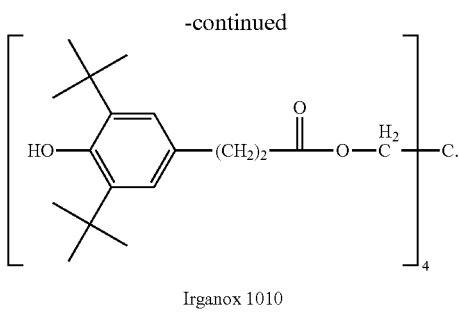

Irganox 1010

Certain pipes of the invention that comprise a hindered amine light stabilizer and/or an antioxidant may provide an oxidative resistance as measured under the OR test (described under the subheading "Assays" below) of greater than 50 years, greater than 75 years, greater than 100 years, greater than 150 years, or greater than 200 years. Certain AO/HALS combinations may also provide greater than 60 minutes, greater than 75 minutes, greater than 90 minutes, greater than 100 minutes, or greater than 125 minutes under the OIT test.

Pipes of the invention may comprise further additives, for example the pipes may comprise processing aids, e.g. fluoropolymers. For example, pipes of the present invention may comprise a fluoropolymer that is selected from 3M™ Dynamar™ polymer processing additives, e.g. 3M™ Dynamar™ Polymer Processing Additive FX 9613 (available from 3M Center, St. Paul, Minn.). When the pipe comprises at least one processing aid, the processing aid may be present at a level of from 0.01 to 1% by weight, for example 0.01 to 0.5% by weight; e.g. 0.02 to 0.4% by weight, 0.02 to 0.1% by weight.

In a preferred embodiment, the material compositions for the pipes according to the invention include combinations of a least one component selected from each of the following six classes of chemical compounds (and may include more than one component from one or more classes): polyolefin, most preferably polyethylene; photoinitiator(s); co-agent(s) (monomers and/or unsaturated oligomers and/or unsaturated polymers); anti-oxidant(s); and processing aids. In the case of drinking water pipes, the required components further include light stabilisers, such as hindered amine light stabilizer(s); and scavengers(s). All of these components may be as defined previously.

Methods

Pipes may be manufactured in accordance with a method or process of the invention. The process of the present invention specifically requires both a co-rotating twin screw extruder to produce PEX pipes and the presence of at least one UV irradiator unit to achieve the crosslinking. The process may include a gear pump to ensure consistency of the extrudate. The process is based on photo-induced crosslinking (UV irradiation) which is very fast and has flexibility in material choice. However there is no premature crosslinking in the extruder.

Figure 2:
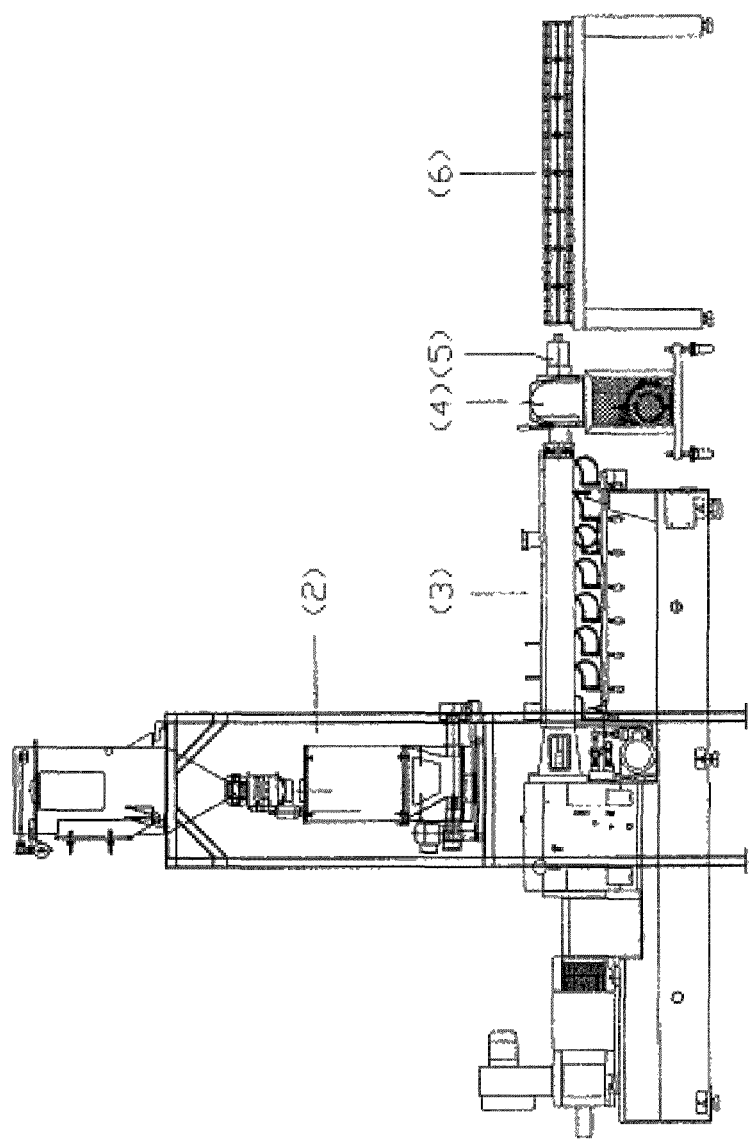
FIG. 2 is a line diagram illustrating apparatus that may be used to perform the process of steps 2 to 6 of FIG. 1.
Figure 3:
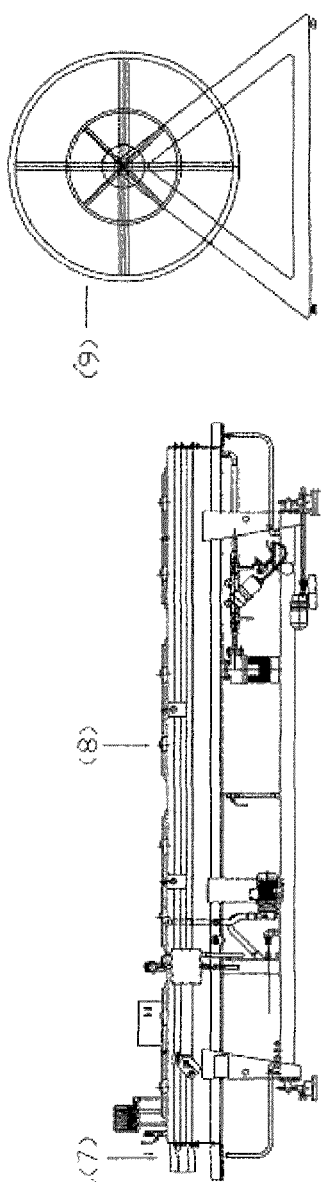
FIG. 3 is a line diagram illustrating apparatus that may be used to perform the process of steps 7 to 9 of FIG. 1.

Specific details of the apparatus of the invention can be seen from the flowchart of FIG. 1 and the schematic drawing in FIG. 2 and FIG. 3. The apparatus of the invention is typically arrange "in line" as a single production line, for example to provide greater convenience. For the purposes of providing enhanced clarity in the schematic drawings, however, the apparatus has been split over FIG. 2 and FIG. 3. With reference to FIGS. 1 to 3, the apparatus typically includes the following components:

(A) Batch mixing: polyolefin structural polymer (e.g. HDPE), along with photoinitiator(s); and optionally one or more of an anti-oxidant (AO), a light stabiliser such as a hindered amine light stabilizer (HALS), co-agent(s) and processing aid(s), to make up the formulation. When a scavenger is used, the scavenger may also be included in the formulation. These components may be premixed in a rotational mixer. The components may be the components of a pipe of the invention as described herein.

(B) Feeding: The mixed material is metered into the extrusion feed throat 2.

(C) Co-rotating twin screw extrusion: A co-rotating twin screw extruder 3 is used to melt, mix, and meter material. With co-rotating, modular screw design technology, influence on material processing properties can be achieved by altering the screw configuration. Influence on material processing properties can also be achieved separately by running at variable RPM, and/or by changing individual barrel temperature values. High flexibility in output and line speeds are key features of this technology.

(D) Gear pump: From the extruder 3, melted polymer passes through a gear pump 4. The gear pump 4 delivers a precise volume of material to the die head 5.

(E) Die head: The die head 5 may be of a spiral mandrel design, and is attached directly after the gear pump 4. This is where polymer is shaped into a pipe profile, via a tip and die attached at the end. The tip and die are machined to specified dimensions as necessary.

(F) Curing chamber with UV Irradiators: Directly after the tip and die, the extruded pipe is introduced to a high energy UV irradiator unit 6. This irradiator makes high speed and efficient crosslinking possible. The irradiator unit 6 may comprise, a series of irradiator modules that are assembled in a row, with each subsequent irradiator module adjacent to the previous module, so that pipe is constantly and consistently being exposed to a controlled level of UV radiation. Other arrangements of UV lamps may also be used, as would be contemplated by the skilled person. The irradiator unit 6 may comprise microwave powered UV lamps, for example high efficiency microwave powered lamps.

(G) Calibration fixture: The pipes next enter the cooling unit 8 through a calibration fixture 7, where the pipe dimensions are calibrated and fixed.

(H) Cooling unit: The cooling is conducted by a cooling unit 8. The cooling unit may comprise a row of spray cooling water baths.

(I) Take up reel: At the end of the production line, typically a coiler 9 receives and puts the pipes on reels.

The process is based on the use of a photo-crosslinkable pipe formulation where a photoinitiator (PI) is added. The PI interacts with the UV irradiation to induce crosslinking of the pipe formulation to form crosslinked polyethylene, i.e., PEX. Along with other additives mixed in with the formulation (when present), the presence of the photoinitiator allows for the tubing to be crosslinked throughout the entire pipe wall. The pipes of the invention may be formulated according to the compositions and components described herein above. Pipes of the invention may also be formed using the formulations of the examples.

The twin screws used in the extruder can in principle be constructed in two different ways, i.e., with a co-rotating or a counter-rotating design. The choice made in the case of the present invention is critical for a number of reasons. Ordinarily, it would be expected that a counter-rotating screw would be an efficient material pump relative to a single screw or a RAM extruder. This means it would be expected to increase the productivity i.e. line speed. However, we have found that a co-rotating extruder is actually an excellent tool for advanced material development and leads to consistent material as well as superior line speed. We have found the co-rotating twin screws to be excellent material pumps for a material such as a thermoplastic polyolefin. Advantages of the arrangement used in this invention include excellent pipe homogeneity and efficient optimisation of pipe tolerances.

The co-rotating twin screws are configured with a number of screw elements along the screw axis, which may be combined in a number of different configurations according to the nature of the input raw olefin and additives. The extruder body of typical co-rotating twin screws is constructed of barrels, which can be seen as separate reactors which also provide the flexibility to dedicate one or more specific barrels to perform in certain ways. For example, it is possible to performed direct injection of raw materials into specific zones of the process i.e. into specific barrels. It is also possible to control the conditions in each barrel independently.

The two parallel co-rotating screws consist of a number of designed screw elements. They are arranged in a modular flexible design with typically 10 operative zones (barrels). Each barrel can have its own design and function (heating, cooling, etc.). The geometry of the screws is such that the channels are lengthwise open, i.e., there is opportunity for flow in axial direction; flow is possible both upstream and upstream. The screws are crosswise closed with conveying elements, i.e., multiple parallel paths along machine axis, i.e., no communication possible between channels. However, the screws can be made crosswise open with kneading elements, which gives opportunity for distributive mixing at expense of pressure generating capacity. The extruder can be designed to act as a true and efficient mixer. The co-rotating twin screws are drag flow pumps with forced displacement at intermesh.

The heat introduced in the process of the invention is fundamentally controlled by shear rate, i.e., mechanical energy, optionally supplemented with heat added from external sources (barrel heating). Fibre, nanoparticles, and/or other fillers may be added directly to the extruder in controlled manner. Fibre for example, may be destroyed by a high shear counter-rotating screw if pre-mixed. For a co-rotating screw however, the fibre can be added late in the process at the end of the screw. This opens up the opportunity to produce composite pipes, as a homogeneous composite, in one single operation. Accordingly in the processes of the invention, Fibre, nanoparticles, and/or other fillers may be added near the end of the screw, thereby reducing the length of time that these components are exposed to shear forces compared to the other components.

Liquids can be added in a controlled fashion, for example at the end of the extruder. A vacuum can be applied in a specific zone, which makes it possible to add components available as slurries or other liquids. For example, the solvent can be removed prior to exit of the extrudate from the twin-screw extruder. Pigments, stabilizers, additional high performance polymers, etc., can also potentially be added sequentially in the extrusion process.

The apparatus used in the methods of the invention is flexible in terms of the processing of different materials and dimensions of the produced pipes, for example because the screw design can easily be altered by re-designing individual screw elements, and/or by moving around existing screw elements. In principle, this means that it is possible to use the same extruder for different pipe dimensions, with e.g. the same extruder output (kilograms/hour; (kg/h)) utilized for all pipe dimensions, which is unique in the industry. For example, the method of the present invention may be performed with an extruder output of greater than 100 kg/h, e.g. greater than 150 kg/hr, greater than 200 kg/h, greater than 250 kg/hr or greater than 300 kg/h. For example, a method of the invention may be performed at an extrusion rate of 100 to 500 kg/hr, 150 to 450 kg/hr, or 200 to 400 kg/hr. Pipe dimensions may be in the range ½" to 8" diameter, e.g. in the range ½" to 4" diameter.

A ½" pipe may be extruded in the method of the present invention at a rate of about 140 kg/h and extrusion speed of about 30 m/min; while a 4" pipe may be extruded at a rate of about 2 m/min.

In the method of the present invention the extrusion may be performed at a temperature of about 200° C. It is therefore preferred that the additives used in the methods of the invention, e.g. photoinitiator(s); and/or co-agent(s); and/or anti-oxidant(s); and/or hindered amine light stabilizer(s); and/or scavengers(s); and/or and processing aids, are not subject to fuming at 200° C.

The term UV curing is normally used when a combination of a photoinitiator and an appropriate monomer/oligomer UV lacquer formulation is exposed to ultraviolet radiation to form high performance thin coatings for various commercially established and well known applications. The methods of the invention may use highly efficient microwave powered UV lamps (for example microwave powered UV lamps provided by, e.g. Fusion UV Systems). The methods of the invention may use microwave powered UV lamps, e.g. highly efficient microwave powered UV lamps, to provide the UV radiation, which in combination with a photoinitiator and an optional co-agent facilitates crosslinking of for example polyethylene to form PEX pipes and tubing.

Assays

Pipes of the invention can be assessed in relation to a number of parameters using standard tests that would be known to the person skilled in the art. A number of suitable assays are described below and other suitable assays have been described previously under the heading "Pipe Standards and Certifications". Parameters of interest include NSF 61 requirements for residues in drinking water conveyed by pipes and ASTM F2023 requirements for chlorine resistance. NSF 61 and ASTM F2023 are both incorporated herein by reference in their entirety.

(A) Stabiliser Functionality Assays

Stabiliser functionality testing is a measure of resistance to oxidative degradation and provides an indication of the long-term performance of pipes (e.g. PEX pipes), in relation to oxidative degradation, e.g. by chlorine in potable water.

One method for testing the stability of a pipe in the presence of an oxidizing agent is the Oxidative Induction Time (OIT) test. In this test, a sample of the pipe material is placed in a DSC and held at a constant temperature of 200° C. in an oxygen-rich atmosphere. The amount of time to the induction of polymer degradation is measured. A longer time before a change in heat flow is observed indicates that the sample would be relatively more stable in the presence of an oxidizing agent. The test method for the OIT test is ASTM-D3895, which is herein incorporated by reference in its entirety.

Another test that is performed on pipe samples to evaluate oxidative resistance is called the Oxidative Resistance (OR) test. This test is described in ASTM F 2023, which is incorporated herein by reference in its entirety. This test places chlorinated water in a pipe under a number of different combinations of elevated pressure and temperature until the pipe fails. The time until failure of the pipe at the different combinations of temperature and pressure is used to estimate the life of the pipe.

In addition, another test described in ASTM F 876, which is incorporated herein by reference in its entirety, is the "Hoop Stress Stabilizer Test". This test is used to demonstrate a pipe material's ability to withstand long term elevated temperature conditions and is described at point 7.10 of ASTM F 876. The method provides that the functionality of a stabilizer of a specific PEX compound shall be verified by hydrostatic testing of pipe made from compound. Test six pipe samples continuously for 3000 h at a hoop stress of 0.70 MPa at 120° C., or for 8000 h at a hoop stress of 0.70 MPa at 110° C. This test is used to demonstrate the specific compound's ability to withstand long temperature conditions set forth elsewhere in this standard.

When tested in accordance with the ASTM F 876 Hoop Stress Stabilizer Test, polyethyene pipes of the invention exceeded the standard and demonstrated effective stabilization for over 12500 hours. The tested pipes were made in accordance with the co-rotating twin screw method of the invention. The tested pipes comprised polyethylene as the structural polymer, 0.75% by weight photoinitiator, 0.5% by weight phenolic antioxidant, 0.15% by weight HALS and 1% by weight of a polybutadiene co-agent. This is better than the results obtained previously for other pipes made using prior art methods and different formulations. For example, when tested in accordance with the ASTM F 876 Hoop Stress Stabilizer Test, polyethylene pipes made using RAM extrusion demonstrated effective stabilisation for 3,000 to 3,500 hours or for over 5,000 hours.

Without being bound by any theory, it is believed that the improvement in this key performance parameter may be due to the improved homogeneity and distribution of the raw materials in the pipe wall. This effect is associated with the co-rotating twin screw extrusion method combined with photo-induced crosslinking to form a crosslinked polyolefin pipe. It is believed that this combination of features has a synergistic effect.

(B) Residuals Assay

Pipes of the invention, when tested in accordance with an assay as set out in NSF 61, may have levels of residual that are less than or equal to the levels set out in Table 1.

the level of each of these compounds may be less than 5 ppb. For example a pipe of the invention when tested in accordance with NSF 61 may have levels of each of benzophenone and p-hydroxybenzophenone of less than 8 ppb, e.g. less than 5 ppb.

For example, an NSF 61 analysis for a PEX pipe of the invention comprising octadecyl isocyanate scavenger revealed benzophenone at 5.5 ppb, benzhydrol at 1 ppb, p-hydroxybenzophenone at 6 ppm and, p-hydroxybenzhydrol at 2.5 ppb.

(C) Pipe Homogeneity Assay

Pipe homogeneity can be determined by analysis of tubing cross-sections by FTIR microscopy to determine the distribution of additives in the polymeric material across the wall of the pipe. The samples are prepared for analysis by cutting thin (approximately 25 µm thick) cross-sections of the polymeric pipe wall with a razor. The cross-sections are then transferred to a KBr salt plate for analysis with suitable FTIR microscope, for example a Nicolet iN10 FTIR microscope equipped with a mapping stage and integrated video camera for locating and specifying areas for analysis. An area map was defined for each sample to include both the inner and outer walls. Data is collected and processed to provide an area map that indicates the distribution of assayed additives in the pipe wall.

This assay was performed on a PEX pipe made in accordance with the invention using a co-rotating twin screw extruder and a corresponding PEX pipe extruded by a single screw extruder. The results of the pipe homogeneity assay indicated that both the antioxidant Irganox 1076 and hindered amine light stabilizer Cyasorb 3853 were more homogeneously distributed in the PEX pipe of the invention.

(D) Crosslinking Assay

The degree of crosslinking may be measured in accordance with the testing protocol set out in ASTM F 876 at 7.9. When tested in this manner, a pipe of the invention may have a degree of crosslinking of about 65% to about 89%. For example the degree of crosslinking may be measured to be about 70% to about 80%, e.g. about 70% to about 75%. The degree of crosslinking may be about 73%, e.g. 73±1% or 73±0.5%.

TABLE 1

Maximum allowance levels of residuals from drinking water pipes

| Chemical Name | CAS# | NSF TAC (MDWL) | EPA MCL | NSF SPAC (MAL) | NSF STEL |
|---|---|---|---|---|---|
| Benzene | 71-43-2 | 5 ppb | 5 ppb | 0.5 ppb | Not derived |
| Benzophenone | 119-61-9 | 300 ppb | | 30 ppb | 2000 ppb |
| Benzhydrol | 91-01-0 | 50 ppb | | 50 ppb | 50 ppb |
| p-Hydroxybenzophenone | 1137-42-4 | 10 ppb | | 10 ppb | 10 ppb |
| p-Hydroxybenzhydrol | 833-39-6 | 10 ppb | | 10 ppb | 10 ppb |
| p-Formylbenzophenone | 20912-50-9 | 10 ppb | | 10 ppb | 10 ppb |

A pipe of the invention when tested in accordance with NSF 61 may have levels of benzene of less than or equal to 5 ppb, benzophenone of less than or equal to 30 ppb, benzhydrol of less than or equal to 50 ppb, p-hydroxybenzophenone of less than or equal to 10 ppb, p-hydroxybenzhydrol of less than or equal to 10 ppb, and p-formylbenzophenone of less than or equal to 10 ppb. For example a pipe of the invention when tested in accordance with NSF 61 may have levels of each of benzophenone, benzhydrol, p-hydroxybenzophenone, p-hydroxybenzhydrol and p-formylbenzophenone of less than or equal to 10 ppb; e.g.

(E) Components Assay

The components present in a polymeric pipe may be assessed by performing an assay that comprises taking a section of the pipe, extracting the section of the pipe with an organic solvent under controlled conditions and analysis the compounds extracted into the solvent using an analytical technique such as GC/MS.

A suitable protocol for organic extraction is provided by the following method. 1 g of pipe sample is placed in 2 mL of xylene and allowed to condition at 70° C. for 24 hours. After that, the remaining solid pipe sample is removed (for example by filtration) providing an extract comprising xylene and components extracted from the pipe sample. If a different amount of pipe sample is used, the amount of xylene may be varied in proportion to the amount of pipe sample.

The extract may then be analysed by GC/MS to determine the components extracted from the pipe using standard methods. A suitable standard method of GC/MS analysis is set out in NSF International Standard/American National Standard for Drinking Water Additives 61-2011 (Jun. 10, 2011) ("NSF 61") at B.7.4.2 "Gas chromatography/mass spectroscopy (GC/MS) analysis" and further specified under subheadings B.7.4.2.1-B.7.4.2.4 on pages B14 to B16, the content of which is incorporated herein by reference.

EXAMPLES

Materials and Properties

TABLE 2

Fundamental characteristics of PE resins used in examples

| Supplier | Density (g/cc) | Melt Flow (g/10 min) | Melting Point (° C.) | DSC Crystallinity (%) |
| --- | --- | --- | --- | --- |
| BasellQ456 | 0.954 | 2.20 | 126.85 | 70.73 |
| Basell Q 456B | 0.954 | 3.00 | 127.01 | 69.52 |
| Basell New Resin | 0.952 | 6.50 | 124.00 | 66.32 |
| Basell Q 471 (Germany) | 0.952 | 10.00 | 124.56 | 63.35 |
| Basell Q 471 (Iowa) | 0.953 | 9.96 | 124.08 | 66.24 |
| Borealis HE 1878 | 0.955 | 3.70 | 129.34 | 74.30 |
| Borealis HE 1878 E | 0.949 | 10.00 | 125.14 | 62.13 |
| Borealis HE 2550 | 0.956 | 6.50 | 129.35 | 75.13 |
| PE-RT Basell | 0.947 | 12.40 | 123.53 | 66.12 |

TABLE 3

Molecular weights of the PE resins and its distributions

| Supplier | $M_w$ | $M_n$ | Molecular Weight Distribution |
| --- | --- | --- | --- |
| Basell Q 456 | 258245 | 33278 | 7.76 |
| Basell Q 456B | 244299 | 56576 | 4.32 |
| Basell New Resin | 146730 | 16434 | 8.92 |
| Basell Q 471 (Germany) | 165033 | 22434 | 7.37 |
| Basell Q 471 (Iowa) | 170760 | 26288 | 6.826 |
| Borealis HE 1878 | 228760 | 24945 | 9.171 |
| Borealis HE 1878 E | 186580 | 34309 | 5.439 |
| Borealis HE 2550 | 207212 | 37133 | 5.587 |
| PE-RT Basell | 180752 | 23164 | 7.804 |

Table 2 lists the PE resins used in the examples and lists a number of properties of these resins, including density, melt flow, melting point and crystallinity. Table 3 indicates the molecular weight and molecular weight distribution of the PE resins. The molecular weight and molecular weight distributions were determined using gel permeation chromatography.

Example 1: Direct Injection

A trial was conducted to test the concept of direct injection of additives into the extruder. The set up included using a 27 mm twin screw extruder, a witte gear pump, and a spider-design die head to form ½" tubing. The tubing was then crosslinked by exposure to UV irradiation. The HDPE base resin, along with processing aid, was added to the extruder via the extruder's feed throat entry point. For all other additives, a blend of 4 components (photoinitiator, co-agent, anti-oxidant, hindered amine light stabilizer), was premixed as a homogeneous liquid, which was directly injected into the extruder via an injection port in one of the upstream barrels. Direct injection into the extruder allowed for no pre-mixing of these components with HDPE resin and processing aid. Mixing of these 4 components with HDPE resin and processing aid occurred strictly from the mixing elements within the twin screw extruder.

An initial baseline experiment was performed, which involved pre-mixing of all components, and adding this mix via the feed throat port of the extruder. The pipe formulation was as follows:

| Raw Material | Weight % |
| --- | --- |
| PE Resin: Basell Q471 | 97.96 |
| Photoinitiator: Benzophenone | 0.75 |
| Co-agent: TAC | 0.75 |
| Antioxidant: Irganox 1010 | 0.4 |
| HALS: Chimassorb 944 LD | 0.1 |
| Processing Aid: FX 9613 | 0.05 |

When running the experimental direct injection trial, a feed rate of the 2% by weight liquid additives was determined, so the same ratio of additives could be obtained as that in the baseline trial. Feed rate of HDPE and processing aid was also changed to account for this 2% addition of additives, so that an exact comparison could be achieved between the two methods of pipe manufacturing. Besides the material introduction, all other processing conditions remained the same for both trials. The experimental trial was run for 1 hour, taking samples to cover the entire range.

The level of crosslinking (CCL) for the two tests were as follows. Average CCL achieved in baseline ~74%. Average CCL achieved for direct injection ~78%. This represents an encouraging result and may be an indication, based on the CCL's given above, that the distribution of the additives is more homogeneous when direct injection is used.

Burst, thermal and OIT values comparing the two methods of feeding were very similar, with OIT values actually being greater for the experimental vs. the control samples. This also an indication of that more homogeneous distribution of stabilizer was accomplished when direct injection was utilized.

Example 2: Pipe Formulations

Formulation 1

| Raw Material/Chemical Compound | CAS # | Mw | Wt. % |
| --- | --- | --- | --- |
| PE; MFI = 10; Basell Q471 (Iowa) | 25213-02-9 | N/A | 97.95 |
| Photoinitiator = Benzophenone | 119-61-9 | 182.22 | 0.75 |
| Co-Agent = Triallyl Cyanurate | 101-37-1 | 249.27 | 0.75 |
| Antioxidant = Irganox 1010 | 6683-19-8 | 1178 | 0.40 |
| HALS = Chimassorb 944 LD | 70624-18-9 | 2000-3100 | 0.10 |
| Processing aid = FX 9613 | NA | NA | 0.05 |
| TOTAL | | | 100 |

CCL: 77%

Note: NSF 61 not determined.

Formulation 2

| Raw Material/Chemical Compound | CAS # | Mw | Wt. % |
|---|---|---|---|
| PE; MFI = 10; Basell Q471 (Iowa) | 25213-02-9 | N/A | 98.16 |
| Photoinitiator = Benzophenone | 119-61-9 | 182.22 | 0.6 |
| Co-Agent = Triallyl Cyanurate | 101-37-1 | 249.27 | 0.6 |
| Antioxidant = Irganox 1076 | 2082-79-3 | 531.00 | 0.5 |
| HALS = Chimassorb 944 LD | 70624-18-9 | 2000-3100 | 0.1 |
| Processing aid = FX 9613 | NA | NA | 0.04 |
| TOTAL | | | 100 |

CCL: 74%
Note: NSF 61 not determined.

Formulation 3

| Raw Material/Chemical Compound | CAS # | Mw | Wt. % |
|---|---|---|---|
| PE; MFI = 10; Basell Q471 (Iowa) | 25213-02-9 | N/A | 97.30 |
| Photoinitiator = Omnipol BP | 515136-48-8 | 730 | 1.00 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Processing aid = Dynamar FX 9613 | NA | NA | 0.05 |
| TOTAL | | | 100 |

CCL: 71%
Special Note: Clear Pipe, No fumes
Note: No NSF 61 Data available

Formulation 4

| Raw Material/Chemical Compound | CAS # | Mw | Wt. % |
|---|---|---|---|
| PE; MFI = 6.5; Borealis HE 2550 | NA | N/A | 97.55 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Processing aid = Dynamar FX 9613 | NA | NA | 0.05 |
| TOTAL | | | 100 |

CCL: 75%
Special Note: Clear Pipe, No fumes
4-Hydroxybenzhydrol: NSF 61 on day 17=77 ppb
4-Hydroxybenzophenone: 127 ppb
Benzene: <1 ppb Formulation 5

| Raw Material/Chemical Compound | CAS # | Mw | Wt. % |
|---|---|---|---|
| PE; MFI = 10; Borealis HE 1878 E | NA | N/A | 97.30 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Processing aid = Dynamar FX 9613 | NA | NA | 0.05 |
| TOTAL | | | 100 |

CCL: 68%
Special Note: Clear Pipe, No fumes
4-Hydroxybenzhydrol: NSF 61 on day 17=46 ppb
4-Hydroxybenzophenone: 85 ppb
Benzene: 8 ppb Formulation 6

| Raw Material/Chemical Compound | CAS # | Mw | Wt. % |
|---|---|---|---|
| PE; MFI = 3; Basell Q 456 B (Iowa) | 9002-88-4 | N/A | 97.60 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| TOTAL | | | 100 |

CCL: 79%
Special Note: Clear Pipe, No fumes
4-Hydroxybenzhydrol: NSF 61 on day 17=135 ppb
4-Hydroxybenzophenone: 191 ppb Formulation 7

| Raw Material/Chemical Compound | CAS # | Mw | Wt. % |
|---|---|---|---|
| PE; MFI = 3; Basell Q 456 B (Iowa) | 9002-88-4 | N/A | 97.75 |
| Photoinitiator = Omnipol BP | 515136-48-8 | 730 | 0.60 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| TOTAL | | | 100 |

CCL: 79%
Special Note: Clear Pipe, No fumes
4-Hydroxybenzhydrol: NSF 61 on day 17=145 ppb
4-Hydroxybenzophenone: 254 ppb
Benzene: 1.2 ppb Formulation 8

| Raw Material/Chemical Compound | CAS # | Mw | Wt. % |
|---|---|---|---|
| PE; MFI = 2; Basell Q456 (Iowa) | 9002-88-4 | N/A | 98.00 |
| Photoinitiator = Benzophenone | 119-61-9 | 182.22 | 0.75 |
| Co-Agent = Triallyl Cyanurate | 101-37-1 | 249.27 | 0.75 |
| Antioxidant = Irganox 1010 | 6683-19-8 | 1178 | 0.40 |
| HALS = Chimassorb 944 | 70624-18-9 | 2000-3100 | 0.10 |
| TOTAL | | | 100 |

CCL: 91%
Note: NSF 61 not determined.

Formulation 9

| Raw Material/Chemical Compound | CAS # | Mw | Wt. % |
|---|---|---|---|
| PE; MFI = 6.5; Basell LP5465X01 (Iowa) | 25213-02-9 | N/A | 96.60 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Nanoclay | | NA | 1.00 |
| TOTAL | | | 100 |

CCL: 69%
Special Note: Slight yellow pipe, No fumes
4-Hydroxybenzhydrol: NSF 61 on day 17<1 ppb
4-Hydroxybenzophenone: 148 ppb
Benzene: 3.7 ppb Formulation 10

| Raw Material/Chemical Compound | CAS # | Mw | Wt. % |
|---|---|---|---|
| PE; MFI = 6.5; Basell LP5465X01 (Iowa) | 25213-02-9 | N/A | 96.10 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Processing aid = Dynamar FX 9613 | NA | NA | 0.00 |
| Nanoclay | NA | NA | 0.50 |
| TOTAL | | | 100 |

CCL: 69%

Special Note: Slight yellow pipe, No fumes

4-Hydroxybenzhydrol: NSF 61 on day 17<1 ppb NSF limit 10 ppb

4-Hydroxybenzophenone: 53 ppb

Benzene: 4 ppb

Formulation 11

| Raw Material/Chemical Compound | CAS # | Mw | Wt. % |
|---|---|---|---|
| PE; MFI = 6.5; Basell LP5465X01 (Iowa) | 25213-02-9 | N/A | 97.50 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Processing aid = Dynamar FX 9613 | NA | NA | 0.00 |
| Nanoclay | NA | NA | 0.10 |
| TOTAL | | | 100 |

CCL: 71%

Special Note: Slight yellow pipe, No fumes

4-Hydroxybenzhydrol: NSF 61 on day 17<1 ppb

4-Hydroxybenzophenone: 65 ppb

Benzene: No Data

Formulation 12

| Raw Material/Chemical Compound | CAS # | Mw | Wt. % |
|---|---|---|---|
| PE; MFI = 6.5; Basell LP5465X01 (Iowa) | 25213-02-9 | N/A | 97.35 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Processing aid = Dynamar FX 9613 | NA | NA | 0.05 |
| Nanoclay (Nanomer 1.31 PS from Aldrich, surface modified contains 0.5-5 wt. % aminopropyltriethoxysilane, 15-35 wt. % octadecylamine) | | NA | 0.20 |
| TOTAL | | | 100 |

CCL: 71%

Special Note: Slight yellow pipe, No fumes

4-Hydroxybenzhydrol: NSF 61 on day 17<1 ppb

4-Hydroxybenzophenone: =85 ppb

Benzene: 3 ppb

Formulation 13

| Raw Material/Chemical Compound | CAS # | Mw | Wt. % |
|---|---|---|---|
| PE; MFI = 6.5; Basell LP5465X01 (Iowa) | 25213-02-9 | N/A | 97.05 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Processing aid = Dynamar FX 9613 | NA | NA | 0.05 |
| Nanoclay (Nanomer 1.31 PS from Aldrich, surface modified contains 0.5-5 wt. % aminopropyltriethoxysilane, 15-35 wt. % octadecylamine) | | NA | 0.50 |
| TOTAL | | | 100 |

CCL: 69%

Special Note: Slight yellow pipe, No fumes

4-Hydroxybenzhydrol: NSF 61 on day 17<1

4-Hydroxybenzophenone: =54 ppb

Benzene: TBD (2 Weeks)

Formulation 14

| Raw Material/Chemical Compound | CAS # | Mw | Wt. % |
|---|---|---|---|
| PE; MFI = 6.5; Basell LP5465X01 (Iowa) | 25213-02-9 | N/A | 97.10 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Octadecyl Isocyanate | 112-96-9 | 295.50 | 0.50 |
| TOTAL | | | 100 |

CCL: 69%

Special Note: Clear pipe, No fumes

4-Hydroxybenzhydrol: NSF 61 on day 17=2.5 ppb

4-Hydroxybenzophenone: =6 ppb

Benzene: 3 ppb

Formulation 15

| Raw Material/Chemical Compound | CAS # | Mw | Wt. % |
|---|---|---|---|
| PE; MFI = 6.5; Basell LP5465X01 (Iowa) | 25213-02-9 | N/A | 97.10 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Aluminum Oxide | 1344-28-1 | 101.96 | 0.50 |
| TOTAL | | | 100 |

CCL: 70%

Special Note: Clear pipe, Some fumes from Isopropyl alcohol on Aluminum oxide

4-Hydroxybenzhydrol: NSF 61 on day 17<1 ppb

4-Hydroxybenzophenone: =92 ppb

Benzene: 8 ppb

Formulation 16

| Raw Material/Chemical Compound | CAS # | Mw | Wt. % |
|---|---|---|---|
| PE; MFI = 6.5; Basell LP5465X01 (Iowa) | 25213-02-9 | N/A | 97.37 |
| Photoinitiator = Omnipol BP | 515136-48-8 | 730 | 0.75 |
| Antioxidant = Irganox 1076 | 2082-79-3 | 531 | 0.50 |
| HALS = Cyasorb 3853 | 167078-06-0 | 294-516 | 0.15 |
| Krasol NN32 | NA | ~2100 | 1.23 |
| TOTAL | | | 100 |

CCL: 59%
Special Note: Clear pipe, No fumes
4-Hydroxybenzhydrol: NSF 61 on day 17=33 ppb
4-Hydroxybenzophenone: =34 ppb
Benzene: 6 ppb Formulation 17

| Raw Material/Chemical Compound | CAS # | Mw | Wt. % |
|---|---|---|---|
| PE; MFI = 10; Basell Q 471 (Iowa) | 25213-02-9 | N/A | 98.05 |
| Photoinitiator = Benzophenone | 119-61-9 | 182.22 | 0.50 |
| Co-Agent = Trimethylolpropane Triacrylate (TMPTA) | 15625-89-5 | 296.32 | 0.80 |
| Antioxidant = Irganox 1076 | 6683-19-8 | 1178 | 0.50 |
| HALS = Cyasorb 3853 | 167078-06-0 | 294-516 | 0.15 |
| Total | | | 100 |

CCL: 71%
Special Note: Clear pipe, rough surface, and some fumes
Note: NSF 61 not determined.

Formulation 18

| Raw Material/Chemical Compound | CAS # | Mw | Wt. % |
|---|---|---|---|
| PE; MFI = 3.75; Borealis HE 1878 | NA | N/A | 97.35 |
| Photoinitiator = Omnipol BP | 515136-48-8 | 730 | 1.00 |
| Co-Agent = Polybutadiene Acrylate | NA | ~2200 | 1.00 |
| Antioxidant = Irganox 1076 | 2082-79-3 | 531 | 0.50 |
| HALS = Cyasorb 3853 | 167078-06-0 | 294-516 | 0.15 |
| TOTAL | | | 100 |

CCL: 82%
Special Note: Clear pipe, no fumes
4-Hydroxybenzhydrol: 30 ppb
4-Hydroxybenzophenone: 83 ppb
Benzene: <1 ppb Formulation 19

| Raw Material/Chemical Compound | CAS # | Mw | Wt. % |
|---|---|---|---|
| PE; MFI = 10; Basell Q 471 (Iowa) | 25213-02-9 | N/A | 98.57 |
| Photoinitiator = Benzophenone | 119-61-9 | 182.22 | 0.50 |
| Co-Agent = Triallyl Cyanurate | 101-37-1 | 249.27 | 0.40 |
| Antioxidant = Irganox 1010 | 6683-19-8 | 1178 | 0.28 |
| HALS = Chimassorb 944 | 70624-18-9 | 2000-3100 | 0.25 |
| TOTAL | | | 100 |

CCL: 81%
Special Note: Clear pipe, fumes
Benzhydrol: 3270 ppb
Benzophenone: 324 ppb
Benzene: 44 ppb Formulation 20

| Raw Material/Chemical Compound | CAS # | Mw | Wt. % |
|---|---|---|---|
| PE; MFI = 6.5; Basell LP5465X01 (Iowa) | 25213-02-9 | N/A | 97.60 |
| Photoinitiator = Genopol BP | NA | 960 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| TOTAL | | | 100 |

CCL: 35%
Special Note: Slight yellow pipe, No fumes
Note: NSF 61 not determined.

Formulation 21

| Raw Material/Chemical Compound | CAS # | Mw | Wt. % |
|---|---|---|---|
| PE; MFI = 10; Basell Q471 (Iowa) | 25213-02-9 | N/A | 97.60 |
| Photoinitiator = Genopol BP | NA | 960 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| TOTAL | | | 100 |

CCL: 33%
Special Note: Slight yellow pipe, No fumes
Note: NSF 61 not determined.

Formulation 22

| Raw Material/Chemical Compound | CAS # | Mw | Wt. % |
|---|---|---|---|
| PE; MFI = 6.5 LP5465X01 (Iowa) | 25213-02-9 | N/A | 97.10 |
| Photoinitiator = Omnipol BP | 515136-48-8 | 730 | 0.75 |
| Co-Agent = Polybutadiene (Ricon 152) | 9003-17-2 | ~2900 | 1.00 |
| Antioxidant = Irganox 1076 | 2082-79-3 | 531 | 0.50 |
| HALS = Cyasorb 3853 | 167078-06-0 | 294-516 | 0.15 |
| Epoxide | 2386-87-0 | 252.31 | 0.25 |
| Aluminum Oxide | 1344-28-1 | 101.96 | 0.25 |
| TOTAL | | | 100 |

CCL: 70%
Special Note: Clear pipe, No fumes
4-Hydroxybenzhydrol: 12 ppb
4-Hydroxybenzophenone: 51 ppb
Benzene: =6 ppb Example 3: Line Speeds and Extruder Output Pipes have been manufactured on a co-rotating twin screw extruder in accordance with the methods of the invention for various pipes sizes. Exemplary line speeds and extruder outputs were as follows:
½" pipe: 30 m/min, 142 kg/h
1" pipe: 23 m/min, 348 kg/h
2" pipe: 6.5 m/min, 342 kg/h
4" pipe: 2 m/min, 350 kg/h These represent a greater than 10-fold increase in line speed (m/min) and output (kg/h) when compared to the typical output of a RAM extrusion method.

The invention claimed is:
1. A polymeric pipe formed from a mixture consisting of:
a polyethylene structural polymer;
a photoinitiator in an amount of 0.02 to 3% by weight;

a co-agent in an amount of 0.02 to 10%, by weight;
a phenolic antioxidant in an amount of 0.1 to 1% by weight; and
optionally a hindered amine light stabilizer in an amount of 0.05 to 1% by weight;
wherein the photoinitiator is a compound of the following formula:

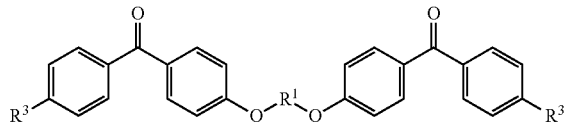

wherein:
$R^1$ is —$(CH_2)_m(C=O)[O(CH_2)_n]_pO(C=O)(CH_2)_q$—;
$R^3$ is selected from group consisting of —H, -halo, —OH, —($C_1$-$C_4$)alkyl, —($C_2$-$C_4$)alkenyl, —O($C_1$-$C_4$)alkyl, and —O($C_2$-$C_4$)alkenyl;
m is 0, 1 or 2;
n is 2, 3, 4, 5 or 6;
p is 2, 3, 4, 5, 6, 7, 8, 9 or 10; and
q is 0, 1 or 2;
wherein the co-agent comprises at least one carbon-carbon double bond;
wherein when tested in accordance with the ASTM F 876 Hoop Stress Stabilizer Test, the pipe demonstrates effective stabilization for over 12500 hours;
wherein the pipe is a cross-linked polyethylene pipe with the characteristics of a pipe obtainable by:
extrusion of a mixture comprising the polyethylene structural polymer, photoinitiator, co-agent, phenolic antioxidant, and optional hindered amine light stabilizer from a co-rotating twin screw extruder to form an extruded pipe; and
cross-linking the structural polymer by irradiating the extruded pipe with UV radiation.

2. The pipe of claim 1, wherein m and q are both 1, n is 4 and p is 3, 4, 5 or 6.

3. The pipe of claim 1, wherein the photoinitiator is

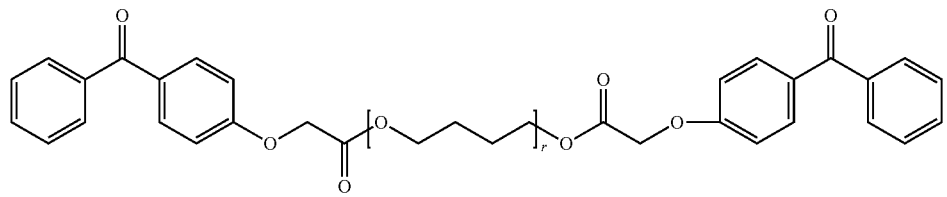

wherein r is 2, 3, 4, 5, 6, 7, or 8.

4. The pipe of claim 1, wherein the photoinitiator is in an amount of 0.3 to 1.5% by weight.

5. The pipe of claim 1, wherein the co-agent comprises at least two reactive carbon-carbon double bonds.

6. The pipe of claim 1, wherein the co-agent comprises at least one of triallylcyanurate, polybutadiene, or trimethylolpropane triacetate.

7. The pipe of claim 1, comprising the hindered amine light stabilizer in the amount of 0.05 to 1% by weight.

8. The pipe of claim 7, wherein the hindered amine light stabilizer comprises:

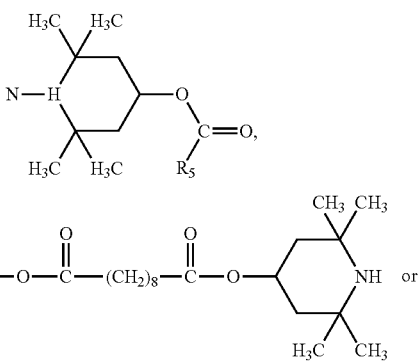

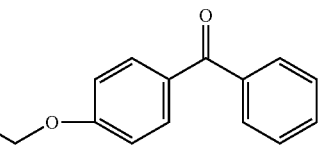

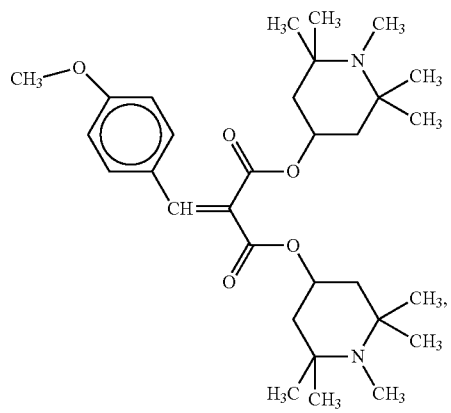

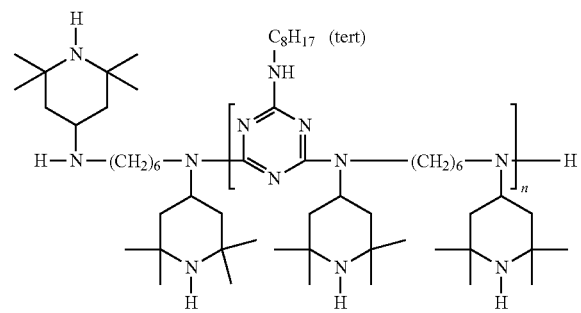

which has a molecular weight of 2000 to 3100 g/mol, or

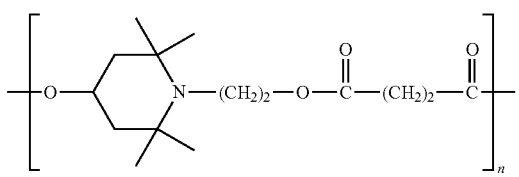

which has a molecular weight of 3100 to 4000 g/mol, wherein $R^5$ is a $C_2$-$C_{24}$ alkyl group.

9. The pipe of claim 1, wherein the antioxidant is a phenolic antioxidant.

10. The pipe of claim 1, wherein the polyethylene structural polymer comprises high density polyethylene (HDPE) with a melt flow index (MFI) of at least 2, or with a melt flow index of at least 5.

11. The pipe of claim 1, where in the pipe is a cross-linked pipe.

12. A method of producing a cross-linked polyolefin pipe comprising:
    extrusion of a mixture from a co-rotating twin screw extruder to form an extruded pipe; and
    cross-linking a polyolefin structural polymer by irradiating the extruded pipe with UV radiation,
    wherein the extrusion mixture comprises the polyolefin structural polymer, a photoinitiator in an amount of 0.02 to 3% by weight, a co-agent in an amount of 0.02-10% by weight, and a phenolic antioxidant in an amount of 0.1 to 1% by weight;
    wherein the photoinitiator is a compound of the following formula:

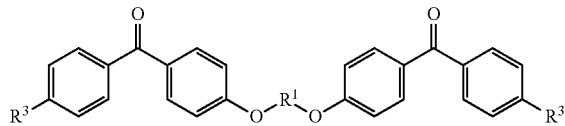

wherein:
$R^1$ is —$(CH_2)_m$(C=O)[O$(CH_2)_n]_p$O(C=O)$(CH_2)_q$—;
$R^3$ is selected from group consisting of —H, -halo, —OH, —($C_1$-$C_4$)alkyl, —($C_2$-$C_4$)alkenyl, —O($C_1$-$C_4$)alkyl, and —O($C_2$-$C_4$)alkenyl;

m is 0, 1 or 2;

n is 2, 3, 4, 5 or 6;

p is 2, 3, 4, 5, 6, 7, 8, 9 or 10; and q is 0, 1 or 2;

and wherein the co-agent comprises at least one carbon-carbon double bond.

13. The method of claim 12, wherein the polyolefin structural polymer is one of polyethylene, polypropylene, polybutylene, polyolefin copolymers or any copolymers thereof.

14. The method of claim 12, wherein the mixture further comprises a hindered amine light stabiliser in an amount of 0.05 to 1% by weight.

15. The method of claim 12, wherein the cross-linked polyolefin pipe has a degree of crosslinking in the range of about 60 to about 90%.

16. The method of claim 12, wherein the polyolefin structural polymer and at least one component are separately injected into the extruder;
    wherein the at least one component is one of the photoinitiator, the co-agent, the phenolic antioxidant, or a combination thereof; and
    wherein the polyolefin structural polymer and the at least one component are mixed by a mixing element of the twin-screw extruder.

17. The method of claim 12, wherein the extrusion is performed at an extruder output of greater than 100 kg/h.

18. The pipe of claim 1, wherein the polyethylene structural polymer is in an amount of at least 85% by weight.

* * * * *